United States Patent
Hirose et al.

(10) Patent No.: US 12,182,909 B2
(45) Date of Patent: Dec. 31, 2024

(54) IMAGE PROCESSING APPARATUS AND IMAGE PROCESSING METHOD FOR GENERATING A SOUND IMAGE

(71) Applicant: Nissan Motor Co., Ltd., Kanagawa (JP)

(72) Inventors: Satoru Hirose, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 99 days.

(21) Appl. No.: 17/801,035

(22) PCT Filed: Feb. 20, 2020

(86) PCT No.: PCT/IB2020/000097
§ 371 (c)(1),
(2) Date: Aug. 19, 2022

(87) PCT Pub. No.: WO2021/165712
PCT Pub. Date: Aug. 26, 2021

(65) Prior Publication Data
US 2023/0222711 A1      Jul. 13, 2023

(51) Int. Cl.
*G06T 11/20*      (2006.01)
*G01H 3/08*      (2006.01)
(Continued)

(52) U.S. Cl.
CPC ............ *G06T 11/206* (2013.01); *G06V 10/72* (2022.01); *G10L 25/18* (2013.01)

(58) Field of Classification Search
CPC ...................................................... G06T 11/206
See application file for complete search history.

(56) References Cited

U.S. PATENT DOCUMENTS 4,956,999 A * 9/1990 Bohannan .............. G01N 29/14
                                                                  73/594
5,808,225 A * 9/1998 Corwin .................. G10H 3/125
                                                                  84/622
(Continued)

FOREIGN PATENT DOCUMENTS

JP      H09-166483 A      6/1997
JP      2013076909 A      4/2013
(Continued)

OTHER PUBLICATIONS

Yu et al., Fault Diagnosis Based on an Approach Combining a Spectrogram and a Convolutional Neural Network with Application to aWind Turbine System, 2018 (Year: 2018).*
(Continued)

*Primary Examiner* — Phong X Nguyen
(74) *Attorney, Agent, or Firm* — Osha Bergman Watanabe & Burton LLP

(57) ABSTRACT

An image processing apparatus includes a controller. The controller calculates a fundamental frequency component included in sound data and a harmonic component corresponding to the fundamental frequency component, converts the fundamental frequency component and the harmonic component into image data, and generates a sound image where the fundamental frequency component and the harmonic component converted into the image data are arranged adjacent each other.

7 Claims, 20 Drawing Sheets

(51) Int. Cl.
*G06V 10/72* (2022.01)
*G10L 25/18* (2013.01)

(56) References Cited

U.S. PATENT DOCUMENTS

| | | | | |
|---|---|---|---|---|
| 6,490,359 | B1* | 12/2002 | Gibson | H04H 60/04 |
| | | | | 381/119 |
| 7,126,876 | B1* | 10/2006 | Rowland | G01S 7/526 |
| | | | | 367/118 |
| 11,227,626 | B1* | 1/2022 | Krishnan Gorumkonda | |
| | | | | G06F 3/167 |
| 11,635,411 | B2* | 4/2023 | Ito | G01N 29/4454 |
| | | | | 73/587 |
| 2005/0149321 | A1* | 7/2005 | Kabi | G10L 25/90 |
| | | | | 704/207 |
| 2006/0011046 | A1* | 1/2006 | Miyaki | G10H 3/125 |
| | | | | 84/616 |
| 2006/0195500 | A1* | 8/2006 | Joublin | G10L 25/90 |
| | | | | 708/309 |
| 2009/0249879 | A1* | 10/2009 | Jeyaraman | G01N 29/348 |
| | | | | 73/644 |
| 2013/0129097 | A1* | 5/2013 | Park | H04M 1/24 |
| | | | | 381/56 |
| 2013/0151245 | A1* | 6/2013 | Stark | G10L 25/90 |
| | | | | 704/207 |
| 2016/0103038 | A1* | 4/2016 | Lacaille | G05B 23/0229 |
| | | | | 73/114.07 |
| 2017/0110135 | A1* | 4/2017 | Disch | G10L 19/0204 |
| 2018/0061382 | A1 | 3/2018 | Summers | |
| 2020/0019855 | A1* | 1/2020 | Kato | G06F 16/00 |
| 2020/0042285 | A1* | 2/2020 | Choi | G10L 25/84 |
| 2021/0074267 | A1* | 3/2021 | Higurashi | G10H 1/0008 |
| 2021/0116293 | A1* | 4/2021 | Yang | H04R 29/001 |
| 2021/0256991 | A1* | 8/2021 | Jun | G10L 25/30 |
| 2021/0304786 | A1* | 9/2021 | Fujii | G10L 25/51 |
| 2022/0130411 | A1* | 4/2022 | Lu | G06N 3/08 |
| 2022/0254006 | A1* | 8/2022 | Jin | G06V 10/764 |
| 2023/0222711 | A1* | 7/2023 | Hirose | G06V 10/72 |
| | | | | 345/440 |

FOREIGN PATENT DOCUMENTS

| | | |
|---|---|---|
| JP | 2017521705 A | 8/2017 |
| WO | 2015068446 A1 | 5/2015 |
| WO | 2019176029 A1 | 9/2019 |

OTHER PUBLICATIONS

Prego et al., Audio Anomaly Detection on Rotating Machinery Using Image Signal Processing, 2016 (Year: 2016).*
Sakamoto, Takayuki, "Introduction to Programming Data Analysis AI Made With MXNet", Jul. 2, 2018, pp. 175-196 (58 pages).
Ortiz-Echeverri, C.J. et al.; "An Approach to STFT and CWT learning through music hands-on labs"; Computer Applications in Engineering Education, Wiley Periodicals, Inc., vol. 26, No. 6, Apr. 25, 2018, pp. 2026-2035 (10 pages).
Ozaki. Kentaro; "Machine Learning and Vibration Power Generation for Vibration Monitoring: Railway Research Institute conducts practical research on fault detection"; Nikkei Monozukuri, vol. 769, Oct. 1, 2018, pp. 35-36 (8 pages).

* cited by examiner

FIG. 3

| | MACHINE LEARNING MODEL | PREDICTION PERFORMANCE |
|---|---|---|
| 1 | Decision Tree | 70% |
| 2 | Random Forest | 80% |
| 3 | Gradient Booted Tree | 90% |
| 4 | General Liner Regression | 85% |
| 5 | Support Vector Machine | 84% |
| 6 | Deep Learning | 92% |

【Deep Learning】

FORM:CNN
NUMBER OF LEARNING:500 (NORMAL/ABNORMAL)
RATIO OF NORMAL・ABNORMAL DATA:50%
NUMBER OF INTERMEDIATE LAYERS:5 LAYERS

Confusion Matrix

50

IMAGE PROCESSING APPARATUS AND IMAGE PROCESSING METHOD FOR GENERATING A SOUND IMAGE

TECHNICAL FIELD

The present invention relates to an image processing apparatus and an image processing method.

BACKGROUND ART

A method for determining whether a sound of a device is normal or abnormal has been known (Patent Literature 1). The invention described in Patent Literature 1 determines whether a sound of a device is normal or abnormal using a locus vector indicating intensity features in all time directions and a previously learned identification parameter.

CITATION LIST

Patent Literature

Patent Literature 1: WO 2015/068446

SUMMARY OF INVENTION

Technical Problem

When a machine learning model for determining an abnormality using sound data is generated, it is conceivable to generate a machine learning model by quantifying sound data by physical quantities, such as sound pressure (dB) indicating the magnitude of sound data and frequency (Hz) indicating the pitch of sound data. Although it is possible to effectively generate a machine learning model by imaging sound data, the invention described in Patent Literature 1 does not mention imaging of sound data.

In response to the above issue, an object of the present invention is to provide an image processing apparatus and an image processing method of imaging sound data.

Technical Solution

An image processing apparatus according to one aspect of the present invention calculates a fundamental frequency component included in sound data and a harmonic component corresponding to the fundamental frequency component, converts the fundamental frequency component and the harmonic component into image data, and generates a sound image where the fundamental frequency component and the harmonic component that have been converted into the image data are arranged adjacent each other.

Advantageous Effects

The present invention enables a machine learning model of sound data to be generated by imaging sound data.

BRIEF DESCRIPTION OF DRAWINGS

FIG. 3 is an example of a machine learning model displayed on a display 50.

DESCRIPTION OF EMBODIMENTS

Figure 1:
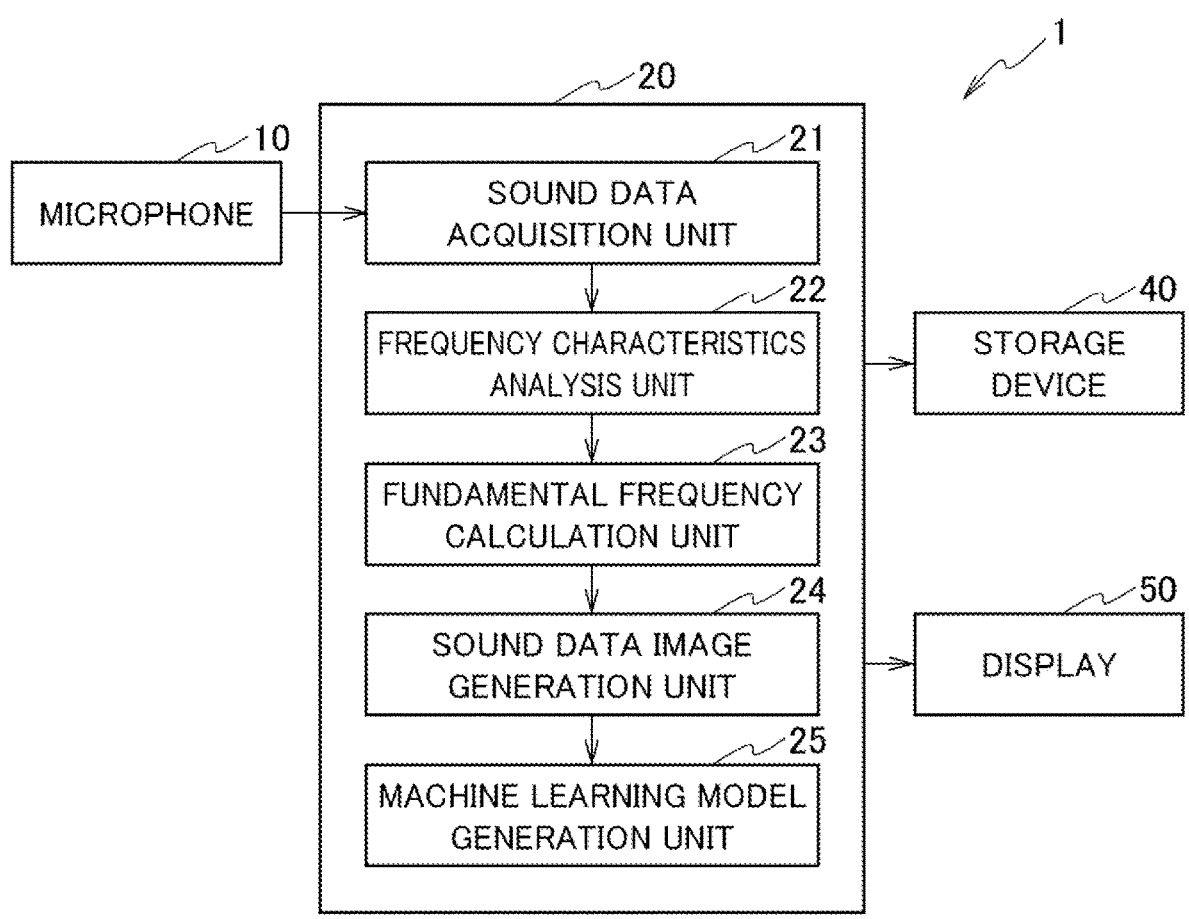
FIG. 1 is a schematic configuration diagram illustrating an image processing apparatus 1 according to a first embodiment of the present invention.

Embodiments of the present invention are described below with reference to the drawings. In the drawings, the same parts are denoted by the same reference numerals, and the description thereof is omitted.

First Embodiment (Configuration Example of Image Processing Apparatus)

A configuration example of an image processing apparatus 1 according to a first embodiment is described with reference to FIG. 1. As illustrated in FIG. 1, the image processing apparatus 1 includes a controller 20, a storage device 40, and a display 50.

The controller 20 acquires sound data via a microphone 10 and analyzes the acquired sound data. The controller 20 is a general-purpose microcomputer including a CPU (central processing unit), a memory, and an input/output unit. The microcomputer has a computer program installed to function as the image processing apparatus 1. By executing the computer program, the microcomputer functions as multiple information processing circuits provided in the image processing apparatus 1. Note that the example described here is to use software to realize the multiple information processing circuits provided in the image processing apparatus 1; however, it is also possible to prepare dedicated hardware for executing each information processing described below to configure the information processing circuits. Further, the multiple information processing circuits may be configured by individual hardware. The controller 20 includes a sound data acquisition unit 21, a frequency characteristics analysis unit 22, a fundamental frequency calculation unit 23, a sound data image generation unit 24, and a machine learning model generation unit 25, as the multiple information processing circuits.

As described above, the sound data acquisition unit 21 acquires sound data via the microphone 10. The sound data acquired by the sound data acquisition unit 21 are converted into an electric signal and treated as time-series data. The sound data acquired by the sound data acquisition unit 21 is given a label indicating normal or abnormal and is used as machine learning teacher data. Note that the sound data is, for example, sound data of a machine used in a factory.

The frequency characteristics analysis unit 22 analyzes frequency characteristics of the sound data acquired by the sound data acquisition unit 21. As an analysis method, signal processing represented by FFT (Fast Fourier Transform) is used, for example. The FFT converts time series data into frequency data to provide "frequency-energy characteristics".

The fundamental frequency calculation unit 23 calculates a fundamental frequency of the sound data using the "frequency-energy characteristics" acquired by the frequency characteristics analysis unit 22. The fundamental frequency calculation unit 23 calculates harmonics corresponding to the calculated fundamental frequency.

The sound data image generation unit 24 generates an image of the sound data using the fundamental frequency calculated by the fundamental frequency calculation unit 23.

The machine learning model generation unit 25 generates an optimum machine learning model for determining normality and abnormality in the sound data using the image generated by the sound data image generation unit 24. The machine learning model generation unit 25 confirms the performance of determining normality and abnormality of sound data by multiple machine learning algorithms using cross verification or the like and outputs a model with the best performance. Note that the machine learning model generation unit 25 may also output other models together.

The storage device 40 stores the "frequency-energy characteristics" acquired by the frequency characteristics analysis unit 22, the sound data image generated by the sound data image generation unit 24, the machine learning model generated by the machine learning model generation unit 25, and the like.

The display 50 displays the machine learning model generated by the machine learning model generation unit 25 and its prediction performance and the like.

Next, an example of the image generated by the sound data image generation unit 24 is described with reference to FIGS. 2A and 2B.

Figure 2A:
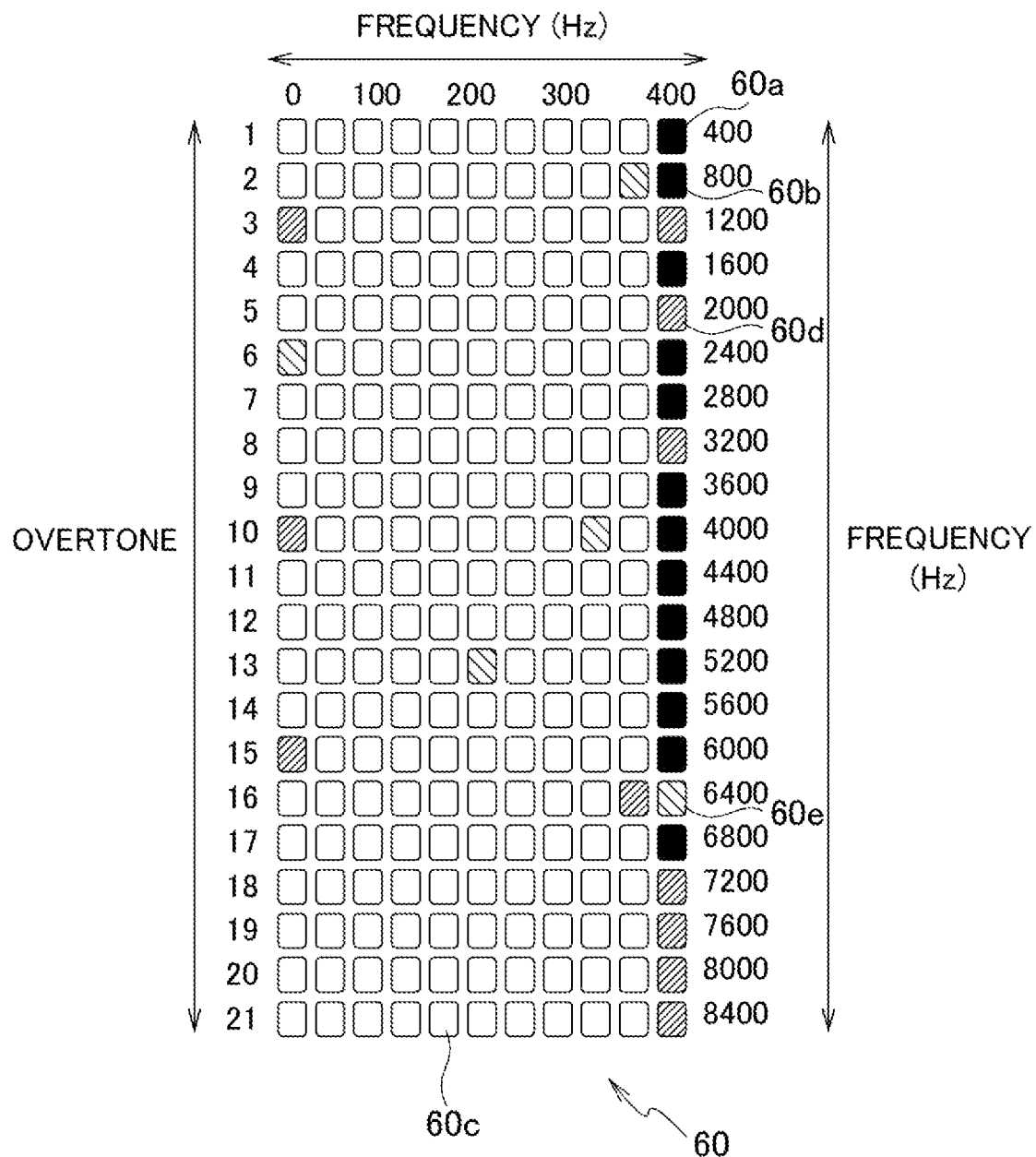
FIG. 2A is an example of an image of sound data according to the first embodiment of the present invention.

An image 60 in FIG. 2A is an example of the image generated by the sound data image generation unit 24. First, a method of generating the image 60 is described. Details of the image 60 is described later. The sound data acquisition unit 21 acquires sound data of any machine. The sound data is converted into an electric signal. Note that the image 60 is acquired by converting sound data into image data and may be referred to as a sound image.

The frequency characteristics analysis unit 22 analyzes the electric signal using the FFT. FIG. 2B illustrates an example of an analysis result. In FIG. 2B, the vertical axis indicates sound pressures (dB(A)), and the horizontal axis indicates frequencies (Hz). The FFT provides the "frequency-energy characteristics" illustrated in FIG. 2B.

Figure 2B:
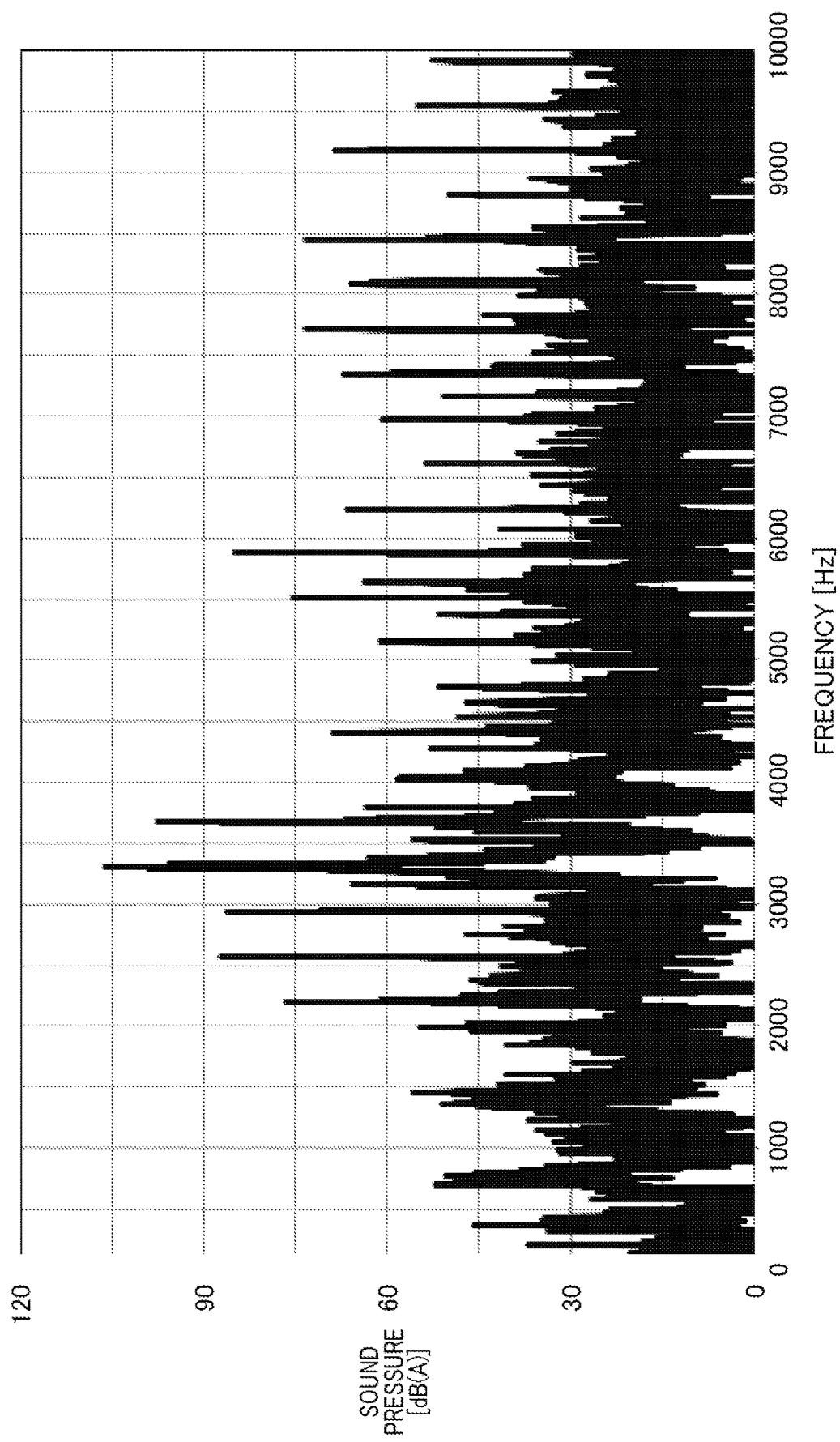
FIG. 2B is an example of a frequency analysis result.

The fundamental frequency calculation unit 23 calculates the fundamental frequency of sound data using the "frequency-energy characteristics" illustrated in FIG. 2B. The fundamental frequency refers to a frequency of the lowest frequency component when the signal (which refers to sound data converted into an electric signal here) is represented by the synthesis of sine waves. The fundamental frequency is sometimes called a fundamental wave. According to the FFT, as illustrated in FIG. 2B, multiple peak frequencies (peaks of a spectrum) generally appears. The method of calculating the fundamental frequency is not limited, but for example, as illustrated in FIG. 2B, the minimum peak frequency (400 Hz in FIG. 2B) among the multiple peak frequencies may be calculated as the fundamental frequency.

As another calculation method, a frequency between peaks may be calculated as the fundamental frequency. As illustrated in FIG. 2B, large peaks appear at 1200 Hz and 1600 Hz. The frequency between the peaks (1600−1200=400 Hz) may be calculated as the fundamental frequency.

As another calculation method, a difference of frequencies between peaks may be acquired, and when the difference is the same as the minimum peak frequency, the frequency may be calculated as the fundamental frequency. Specifically, as illustrated in FIG. 2B, since the difference in frequency between the peaks (400 Hz as described above) is the same as the minimum peak frequency (400 Hz), the fundamental frequency calculation unit 23 may calculate 400 Hz as the fundamental frequency. Here, "the difference is the same as the minimum peak frequency" is not limited to the exact same. "The difference is the same as the minimum peak frequency" means substantially the same (can be regarded as nearly the same). In the first embodiment, the fundamental frequency is set as 400 Hz. The fundamental frequency is one per sound data.

Next, the fundamental frequency calculation unit 23 calculates harmonics corresponding to the calculated fundamental frequency. Harmonics means a higher-order frequency component that includes integral multiples of a wave motion having a certain frequency component (here, the fundamental frequency component). Harmonics are sometimes called overtones in the field of music. As illustrated in FIG. 2B, large peaks are observed at frequencies that are integral multiples (2×, 3×, etc.) of the fundamental frequency (400 Hz). The fundamental frequency calculation unit 23 calculates frequencies (800 Hz, 1200 Hz, etc.) of integral multiples of as harmonics corresponding to the fundamental frequency.

The sound data image generation unit 24 generates a two-dimensional image, such as a so-called heat map, as illustrated in FIG. 2A, using the fundamental frequency and harmonics calculated by the fundamental frequency calculation unit 23. In FIG. 2A, the vertical axis represents overtones and the horizontal axis represents frequencies. More specifically, the horizontal axis indicates frequencies of 0 to 400 Hz. The overtones on the vertical axis mean overtones of the fundamental frequency (400 Hz). The image 60 is formed by multiple pixels indicating corresponding frequencies. In the image 60, under a pixel 60a indicating 400 Hz, a pixel 60b indicating 800 Hz (2 times 400 Hz) is arranged adjacently. The same applies below, and under the pixel 60b indicating 800 Hz, a pixel indicating 1200 Hz (3 times 400 Hz) is arranged adjacently. In the lower right of the image 60, a pixel indicating 8400 Hz (21 times 400 Hz) is arranged. In the horizontal axis and the vertical axis, the pixels are arranged in frequency order. The image 60 may be image data made from a two-dimensional matrix in which two-dimensional predetermined areas (areas where the pixels 60a, 60b are arranged) are set for respective frequency components, and these predetermined areas are arranged adjacently in the vertical and horizontal directions.

In this way, the sound data image generation unit 24 converts the fundamental frequency component and harmonic component calculated by the fundamental frequency calculation unit 23 into image data. The fundamental frequency component converted into image data is represented as the pixel 60a (400 Hz). The harmonic component converted into the image data is represented as the pixel 60b (800 Hz). As illustrated in FIG. 2A, the image 60 (sound image) is generated in which the fundamental frequency component (pixel 60a indicating 400 Hz) and the harmonic component (pixel 60b indicating 800 Hz) converted into image data are arranged adjacently. The sound image is acquired by converting the fundamental frequency component included in sound data and the harmonic component into an image by predetermined processing.

The image 60 is illustrated in a rectangular shape but is not limited to this. For example, the image 60 may have a thin comb shape for increasing resolution. Each of the pixels is also illustrated in a rectangle shape but is not limited to this. Further, the respective pixels are discretely arranged at a distance from each other but not limited thereto. The respective pixels may be continuously arranged without any distance from each other. The vertical axis and the horizontal axis may be interchanged. In FIG. 2A, the fundamental frequency component and the harmonic component corresponding to the fundamental frequency component are arranged adjacently in the vertical axis but may be arranged adjacently in the horizontal axis.

In FIG. 2A, each pixel is set as a brightness or color corresponding to the amplitude of the sound data. For example, the pixels 60a and 60b having large sound pressures are set to a dark color (for example, red), such as in a heat map. Other pixels (for example, pixel 60c) are set to a light color (for example, green), such as in a heat map. Note that the pixels 60d and 60e are examples of indication of an abnormality in sound data, and brightnesses or colors are set differently from other pixels. The brightnesses or colors of pixels are set so that the operator can grasp the intensity, normality, abnormality, and the like of the sound data at a glance.

Next, a machine learning model is described with reference to FIG. 3. The machine learning model generation unit 25 generates an optimum machine learning model for determining normality and abnormality in sound data using the image 60 generated by the sound data image generation unit 24. As described above, the label indicating normal or abnormal is attached to the sound data. Thus, the machine learning in the first embodiment is so-called supervised learning.

The machine learning model generation unit 25 generates a machine learning model using a well-known machine learning algorithm. Machine learning algorithms to be used include Decision Tree, Random Forest, Gradient Boosted Tree (GBT), General Linear Regression (GLR), Support Vector Machine (SVM), and Deep Learning. However, the present invention is not limited thereto, and any algorithm capable of supervised learning may be used.

The machine learning prediction performance is compared by any one of or a combination of items indicating the performance of the machine learning algorithm, such as Accuracy, Precision, and Recall. The model with the highest prediction performance is selected based on the comparison result.

As illustrated in FIG. 3, the machine learning model generation unit 25 displays the generated machine learning model and its prediction performance on the display 50. On the left side of the display 50, the generated machine learning model (Decision Tree, etc.) and its prediction performance (70%, etc.) are displayed. On the right side of the display 50, details of the model (Deep Learning) with the highest prediction performance are displayed. As the details of Deep Learning, the form, number of learning, ratio of normal and abnormal data, number of intermediate layers, and a Confusion Matrix acquired by cross validation.

Figure 4:
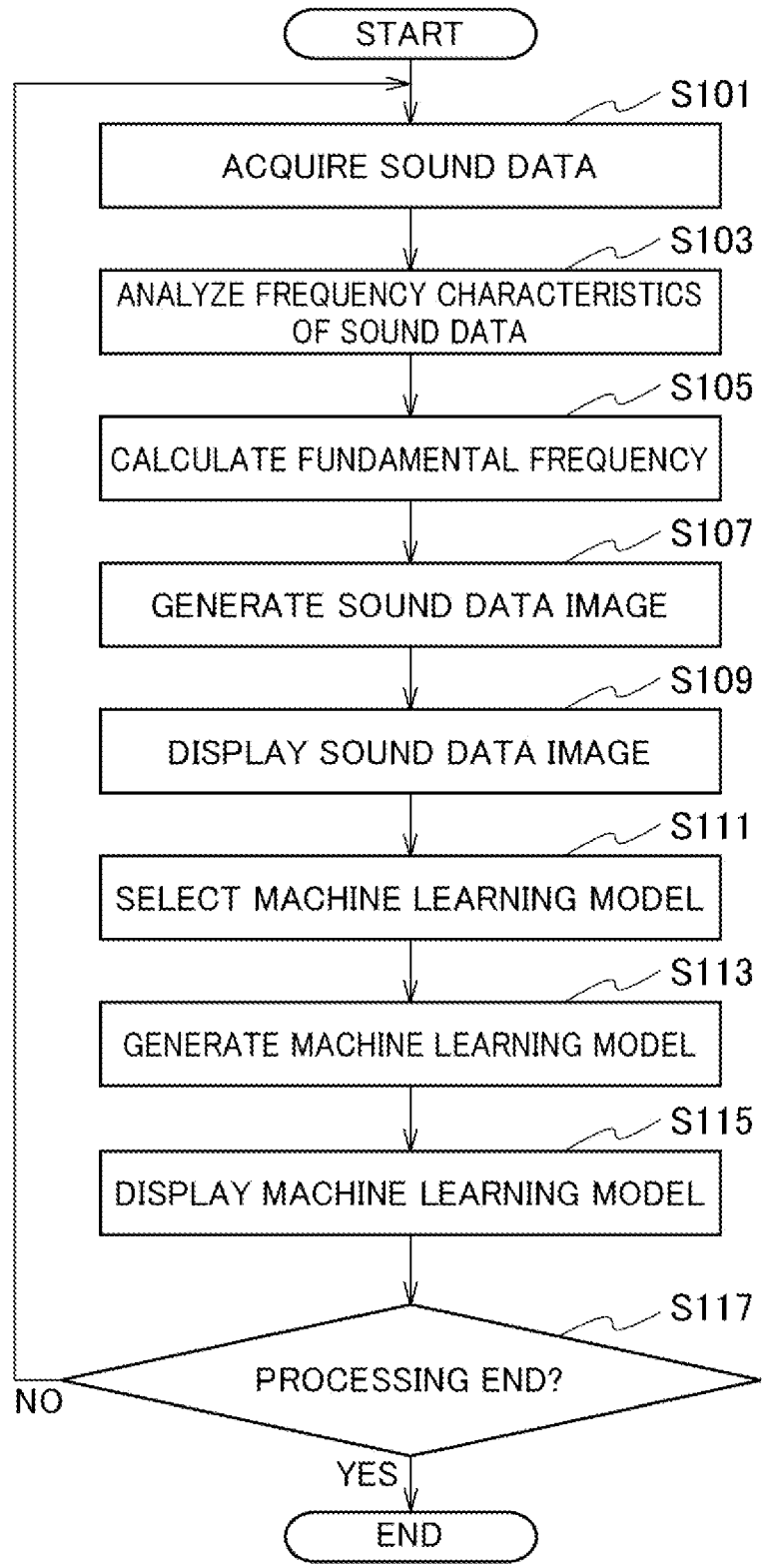
FIG. 4 is a flowchart illustrating an operation example of the image processing apparatus 1 according to the first embodiment of the present invention.

Next, an operation example of the image processing apparatus 1 according to the first embodiment is described with reference to a flowchart of FIG. 4.

In step S101, the sound data acquisition unit 21 acquires sound data via the microphone 10. The acquired sound data are converted into an electric signal and treated as time series data. The process proceeds to step S103, and the frequency characteristics analysis unit 22 analyzes the electric signal acquired in step S101 using the FFT. The FFT provides the "frequency-energy characteristics" (see FIG. 2B).

The process proceeds to step S105, and the fundamental frequency calculation unit 23 calculates a fundamental frequency of the sound data using the "frequency-energy characteristics" acquired in step S103. The above-described method is used for calculating the fundamental frequency. The process proceeds to step S107, and the sound data image generation unit 24 generates the image 60, such as a heat map, using the fundamental frequency calculated in step S105 (see FIG. 2A). In the image 60, a fundamental frequency component and a harmonic component corresponding to the fundamental frequency component are arranged adjacently.

The process proceeds to step S109, and the image 60 generated in step S107 is displayed on the display 50. Each of the pixels forming the image 60 is set as a brightness or color corresponding to an amplitude of the sound data. Thus, the operator who sees the image 60 can grasp the intensity, normality, abnormality, and the like of the sound data at a glance.

The process proceeds to step S111, and the machine learning model generation unit 25 selects an algorithm for generating a machine learning model. The selected algorithm includes Decision Tree, Random Forest, Gradient Boosted Tree (GBT), General Liner Regression (GLR), Support Vector Machine (SVM), and Deep Learning.

The process proceeds to step S113, and the machine learning model generation unit 25 generates a machine learning model using the algorithm selected in step S111. The process proceeds to step S115, and the machine learning model generation unit 25 displays the generated machine learning model and its prediction performance on the display 50 (see FIG. 3). A series of processing is repeatedly executed until completion (step S117).

Advantageous Effects

As described above, the image processing apparatus 1 according to the first embodiment provides the following advantageous effects.

The fundamental frequency calculation unit 23 calculates a fundamental frequency component included in sound data and a harmonic component corresponding to the fundamental frequency component. The sound data image generation unit 24 converts the fundamental frequency component and harmonic component calculated by the fundamental frequency calculation unit 23 into image data. The sound data image generation unit 24 generates the image 60 (sound image) in which the fundamental frequency component (pixel 60*a* in FIG. 2A) and harmonic component (pixel 60*b* in FIG. 2A) converted into image data are arranged adjacently. By generating a sound image having such an arrangement, it is possible to effectively generate a machine learning model. Thus, it is possible to clearly display or process the amount of sensation, such as a timbre, which cannot be digitized by a time-series sound signal or spectral characteristics by FFT.

The fundamental frequency component (pixel 60*a*) and the harmonic component (pixel 60*b*) have an overtone relationship. Monophonic tones, such as those of automobile horns and stringed instruments, are influenced by their overtones. According to the first embodiment, such a relationship can be displayed as a sound image.

The sound data image generation unit 24 arranges the fundamental frequency component (pixel 60*a*) and the harmonic component (pixel 60*b*) adjacent to each other on the vertical axis or the horizontal axis of the sound image. This enables the relationship between the fundamental frequency and the harmonic component to be displayed as a two-dimensional sound image.

The sound data image generation unit 24 generates a sound image by converting the fundamental frequency component and the harmonic component into image data where brightnesses or colors corresponding to amplitudes of the sound data are set. This enables the intensity of the sound or the like to be clearly displayed as a sound image.

The sound data image generation unit 24 arranges multiple frequency components of the sound data in the order of frequency on the vertical axis or the horizontal axis of the sound image. This enables the sound data to be displayed as a two-dimensional sound image.

Second Embodiment

Figure 5:
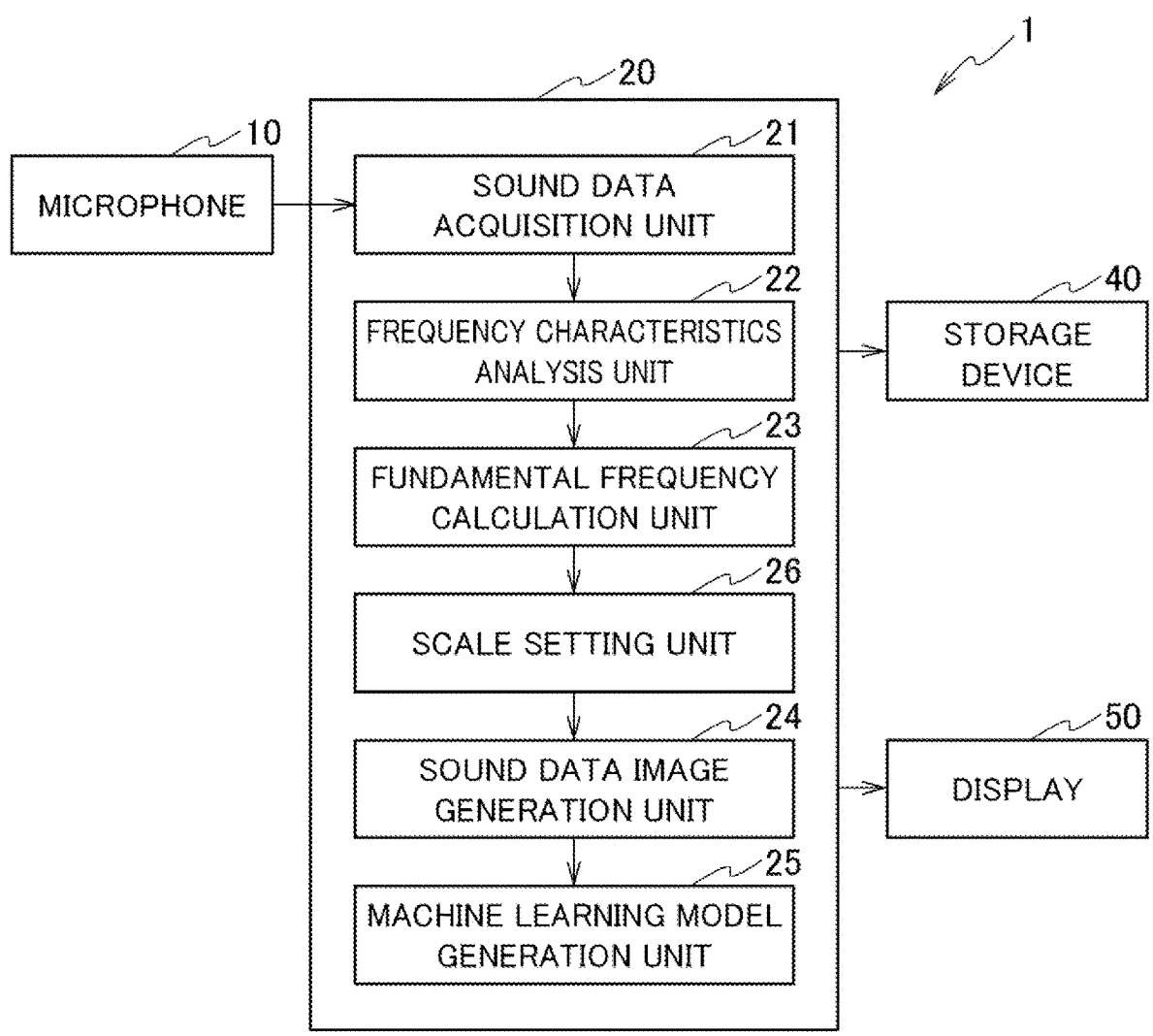
FIG. 5 is a schematic configuration diagram illustrating an image processing apparatus 1 according to a second embodiment of the present invention.

Next, a second embodiment of the present invention is described with reference to FIG. 5. The second embodiment differs from the first embodiment in that the controller 20 includes a scale setting unit 26. A description of a configuration that overlaps the first embodiment is omitted with reference to reference numerals. The following description focuses on the difference.

The scale setting unit 26 uses the "frequency-energy characteristics" acquired by the frequency characteristics analysis unit 22 to set a twelve-tone scale of "C, C #, D, D #, E, F, G, G #, A, A #, B, B #, (C)", which corresponds to the "do, re, mi, fa, sol, la, ti (do)" used in music, and octaves (1 to 10 octaves), which are overtones. The scale setting unit 26 classifies sounds of respective frequencies into the twelve-tone scale using the twelve-tone scale and octaves.

Next, an example of an image generated by the sound data image generation unit 24 is described with reference to FIG. 6.

Figure 6:
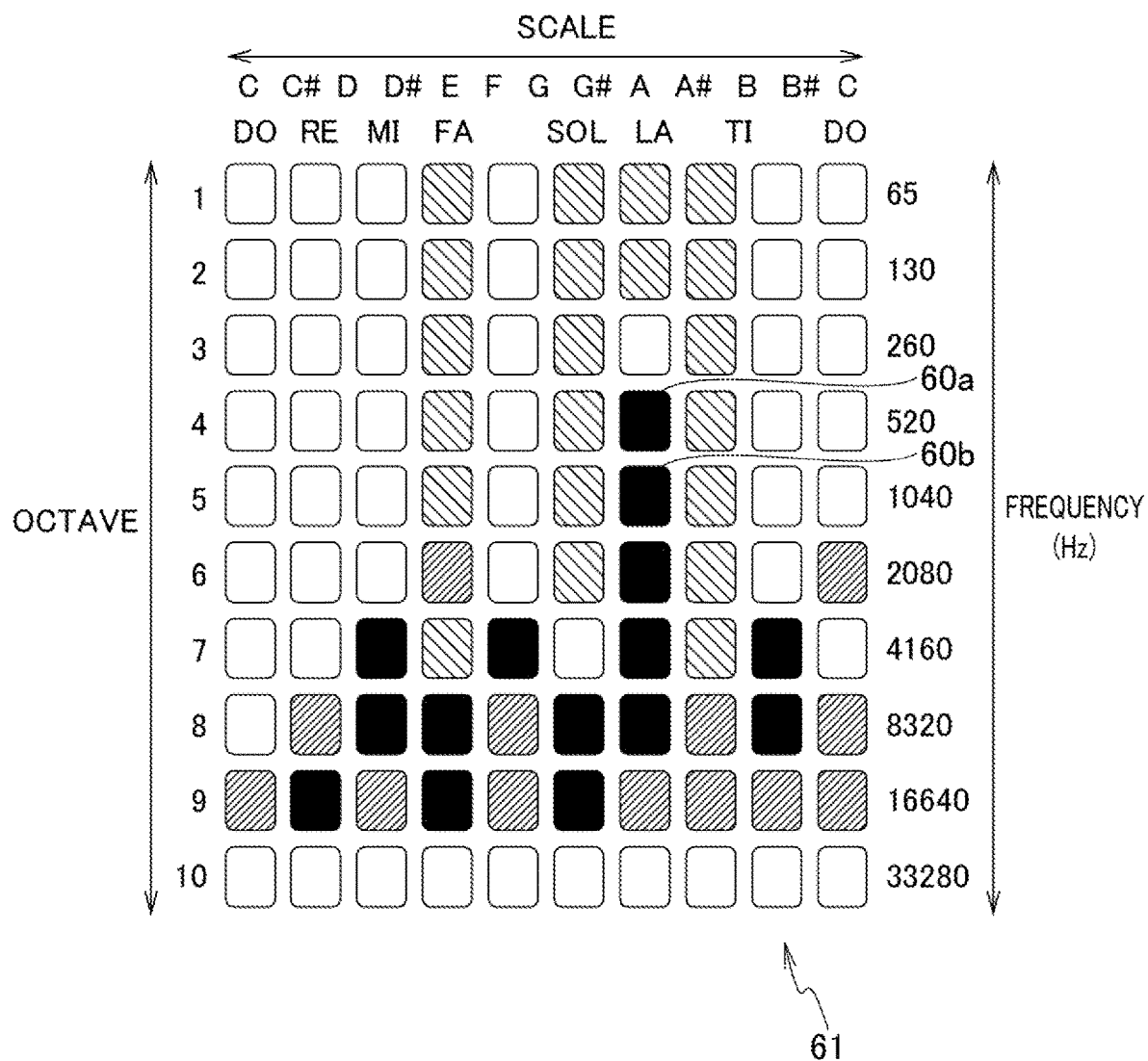
FIG. 6 is an example of an image of sound data according to the second embodiment of the present invention.

An image 61 in FIG. 6 is an example of an image generated by the sound data image generation unit 24. The sound data image generation unit 24 generates the image 61 by arranging pixels indicating frequencies so as to correspond to the twelve-tone scale using the twelve-tone scale and octaves set by the scale setting unit 26 and the frequencies classified by the scale setting unit 26. In FIG. 6, the horizontal axis indicates the twelve-tone scale, and the vertical axis indicates octaves (overtones of frequencies). The first line of the image 61 indicates a scale from 32 Hz to 65 Hz, and as the line goes down, it indicates overtones. Note that in the example in FIG. 2, overtones have been described as integral multiples of the fundamental frequency, but in the example in FIG. 6, an overtone means that it is twice the frequency of the previous one.

In the second embodiment, the fundamental frequency is not 400 Hz but any value. A pitch name corresponding to the pixel 60*a* indicating the fundamental frequency is "A". A pitch name corresponding to the pixel 60*b* indicating a harmonic corresponding to the fundamental frequency is also "A". As illustrated in FIG. 6, the pixel 60*a* and the pixel 60*b* are arranged adjacent to each other. Generating the image 61 enables the sound data to be represented as a two-dimensional image adapted to human hearing characteristics.

The image 61 is also illustrated in a rectangular shape like the image 60 (see FIG. 2A) but is not limited thereto. Modifiable matters in the image 60 also apply to the image 61.

The machine learning model generation unit 25 generates an optimum machine learning model for determining normality and abnormality in sound data using the image 61. Since the details are the same as those of the first embodiment, the description thereof is omitted.

Figure 7:
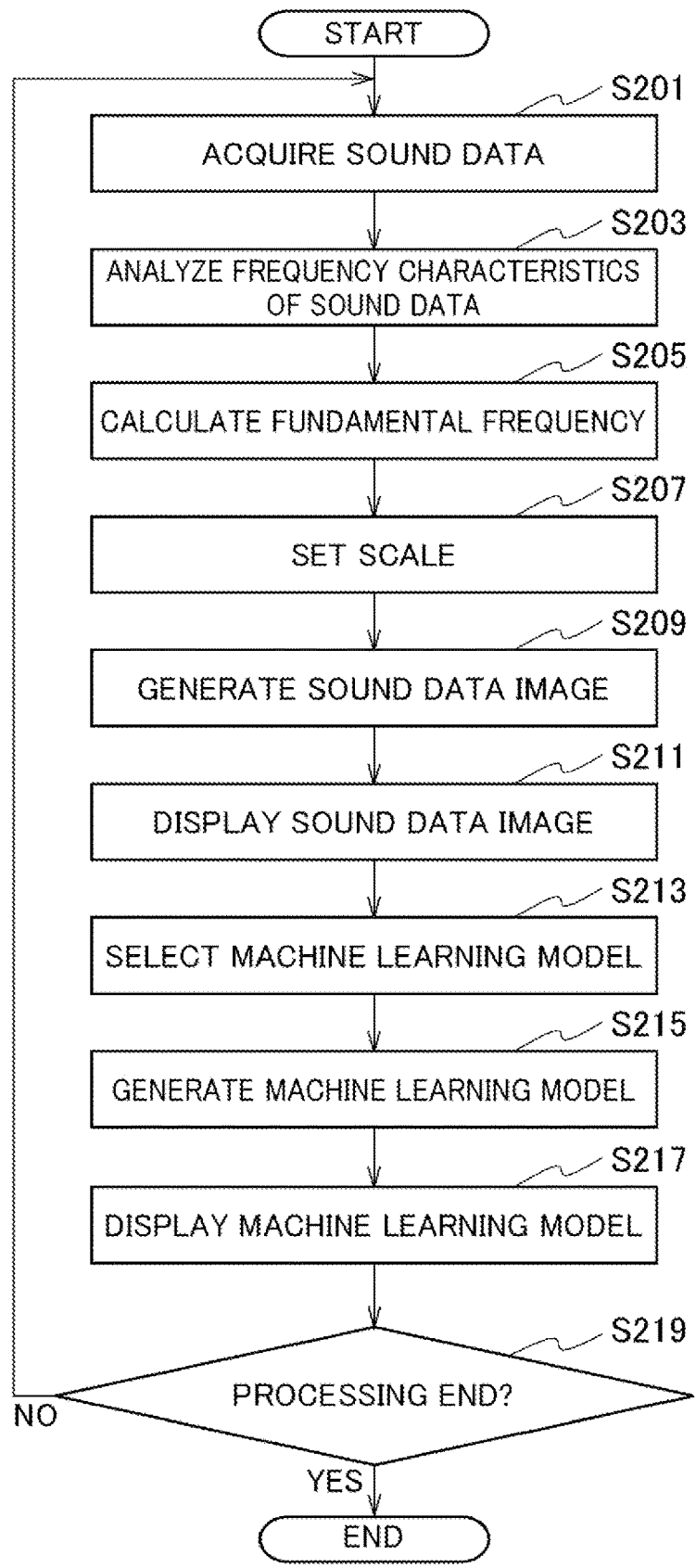
FIG. 7 is a flowchart illustrating an operation example of the image processing apparatus 1 according to the second embodiment of the present invention.

Next, an operation example of the image processing apparatus 1 according to the second embodiment is described with reference to a flowchart of FIG. 7. However, the processes in steps S201 to S205 and S209 to S219 are the same as those in steps S101 to S105 and S107 to S117 in FIG. 4, and thus the description thereof is omitted.

In step S207, the scale setting unit 26 sets the twelve-tone scale and octaves that are overtones thereof using the "frequency-energy characteristics" acquired in step S203. The scale setting unit 26 classifies sounds of respective frequencies into the twelve-tone scale using the twelve-tone scale and octaves.

Advantageous Effects

In the second embodiment, the fundamental frequency component and the harmonic component have the same scale. The second embodiment enables music-related events, such as a scale and an octave, to be displayed as an image.

Third Embodiment

Figure 8:
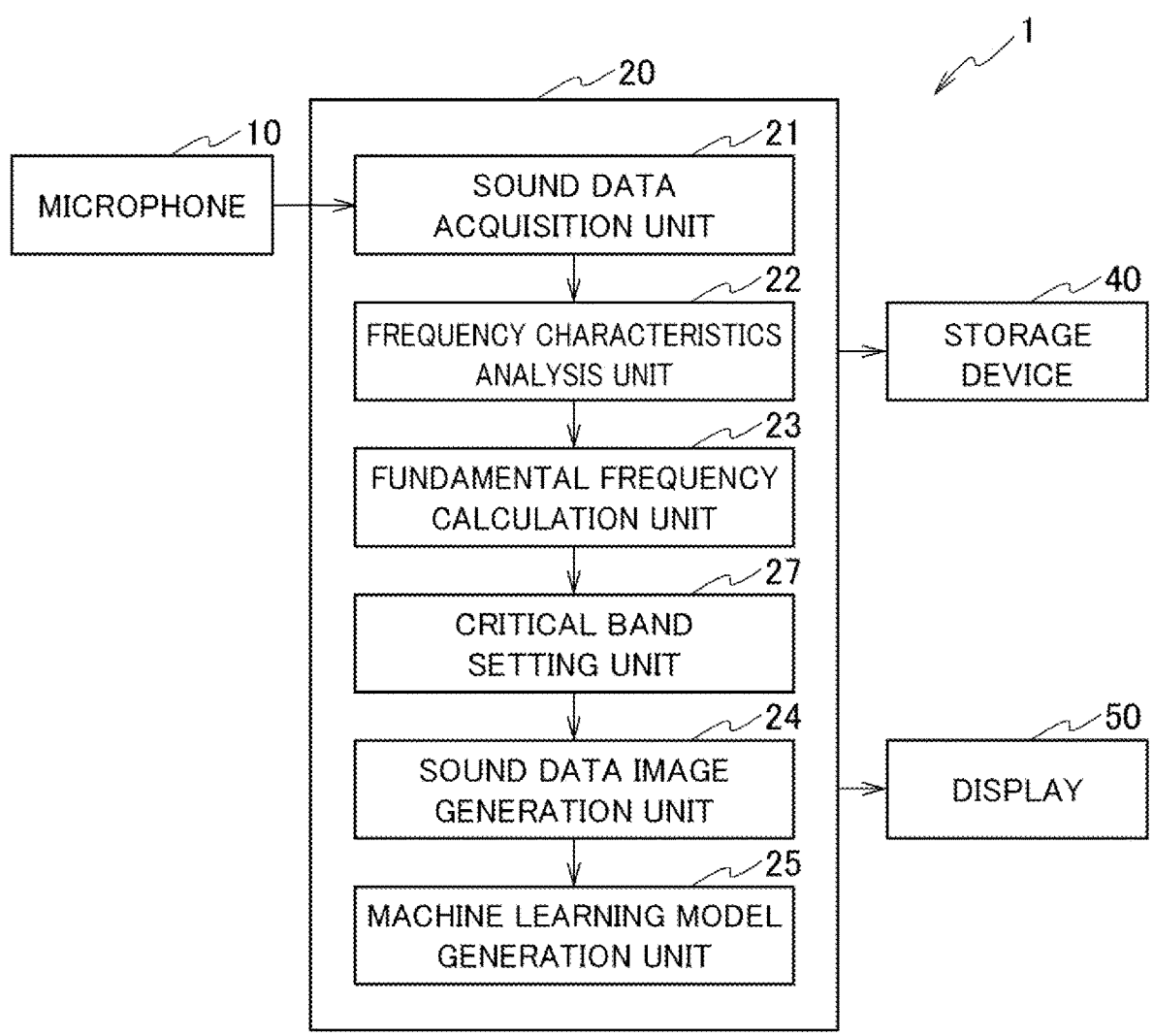
FIG. 8 is a schematic configuration diagram illustrating an image processing apparatus 1 according to a third embodiment of the present invention.

Next, a third embodiment of the present invention is described with reference to FIG. 8. The third embodiment differs from the first embodiment in that the controller 20 includes a critical band setting unit 27. A description of a configuration that overlaps the first embodiment is omitted with reference to reference numerals. The following description focuses on the difference.

The critical band setting unit 27 sets the twelve-tone scale of "C, C #, D, D #, E, F, G, G #, A, A #, B, B #, (C)", which corresponds to the "do, re, mi, fa, sol, la, ti (do)" used in music, and a critical band (band numbers are 1 to 24), which is human hearing characteristics, using the "frequency-energy characteristics" acquired by the frequency characteristics analysis unit 22. The critical band setting unit 27 classifies sounds of respective frequencies into the twelve-tone scale using the twelve-tone scale and the critical band.

The critical band is defined as a maximum frequency band when the sound intensity of band noise with a constant band sound pressure level is constant regardless of a bandwidth. As another definition, the critical band is defined as a minimum frequency bandwidth of band noise, which becomes a sound pressure level at which a pure sound equal to a center frequency of the band noise is just heard when the bandwidth is increased while the spectrum level of the band noise is kept constant.

Next, an example of an image generated by the sound data image generation unit 24 is described with reference to FIG. 9.

Figure 9:
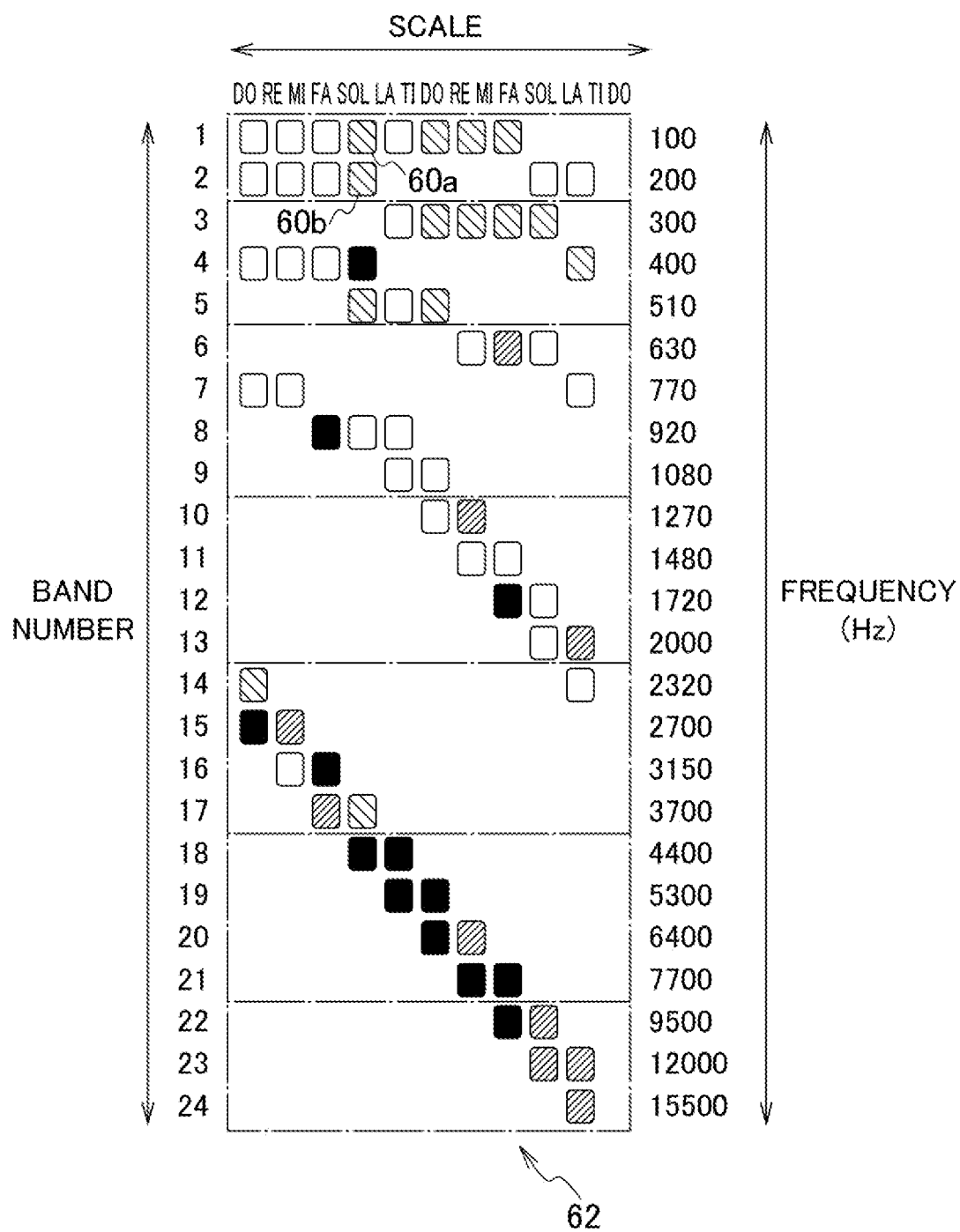
FIG. 9 is an example of an image of sound data according to the third embodiment of the present invention.

An image 62 in FIG. 9 is an example of an image generated by the sound data image generation unit 24. The sound data image generation unit 24 generates the image 62 by arranging pixels indicating frequencies so as to correspond to the twelve-tone scale using the twelve-tone scale and critical band set by the critical band setting unit 27 and the frequencies classified by the critical band setting unit 27.

In FIG. 9, the horizontal axis indicates the twelve-tone scale, and the vertical axis indicates a critical band (band numbers are 1 to 24). In FIG. 9, the "C, C #, D, D #, E, F, G, G #, A, A #, B, B #, C" in FIG. 6 is omitted. In FIG. 9, the horizontal axis indicates 32 Hz to 130 Hz, which is a combination of a first octave and a second octave. The number of the critical band indicates the minimum frequency in that critical band. When the vertical axis is indicated by frequency, the frequency increases in the order of 100 Hz, 200 Hz, 300 Hz, 400 Hz, and 510 Hz. The reason why the increase in frequency is irregular on the vertical axis is because it simulates human hearing characteristics. Dashed-dotted lines in FIG. 9 indicate sensitivity characteristics with respect to the loudness of sound. A band surrounded by a dashed-dotted line indicates having a similar sensitivity characteristic.

In the third embodiment, the fundamental frequency is not 400 Hz but any value. As illustrated in FIG. 9, a pixel 60*a* indicating a fundamental frequency and a pixel 60*b* indicating a harmonic corresponding to the fundamental frequency are arranged adjacently. By generating the image 62 in which the fundamental frequency component and harmonic component having a relationship with respect to the critical band of human hearing are arranged adjacently, it is possible to represent sound data as a two-dimensional image matching human hearing characteristics.

The image 62 is also illustrated in a rectangular shape like the image 60 (see FIG. 2A) but is not limited thereto. Modifiable matters in the image 60 also apply to the image 62.

The machine learning model generation unit 25 generates an optimum machine learning model for determining normality and abnormality in sound data using the image 62. The details are the same as those of the first embodiment, and thus the description thereof is omitted.

Figure 10:
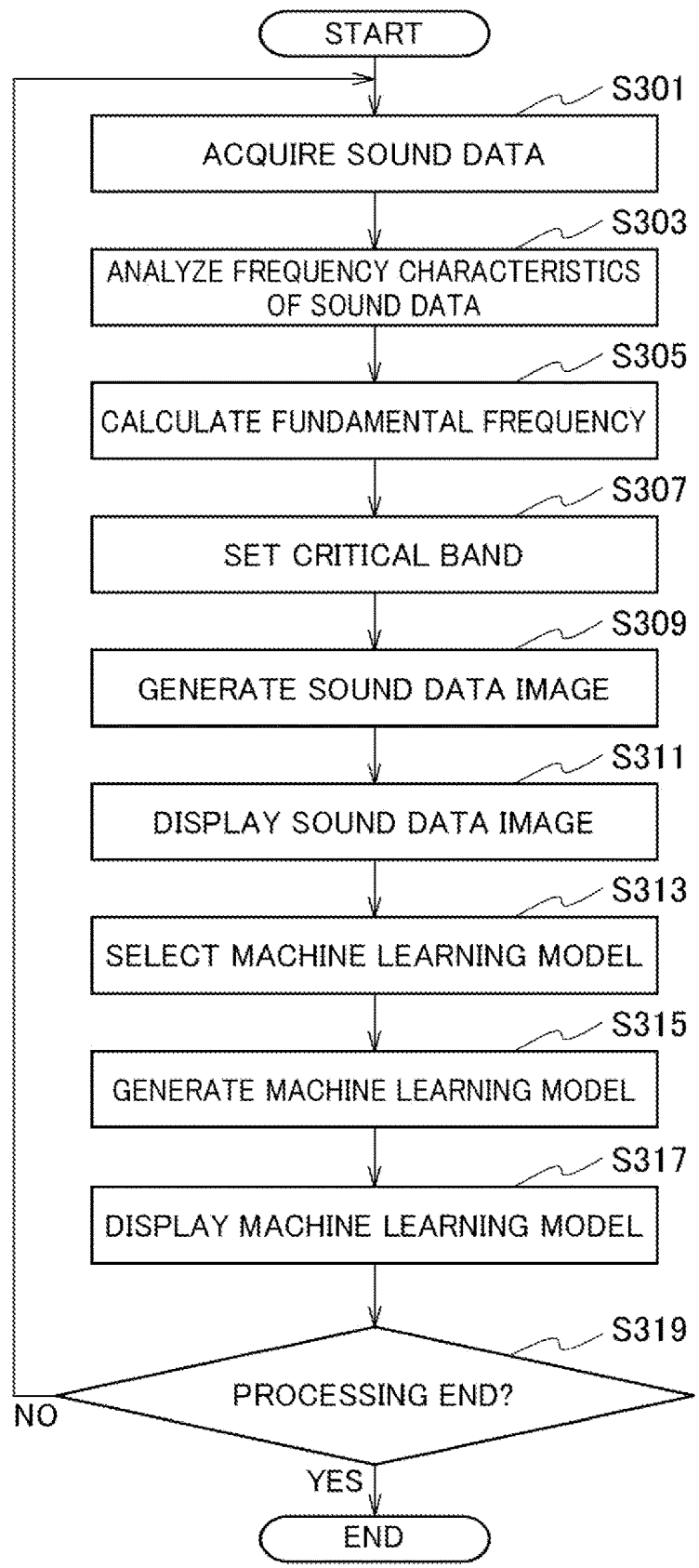
FIG. 10 is a flowchart illustrating an operation example of the image processing apparatus 1 according to the third embodiment of the present invention.

Next, an operation example of the image processing apparatus 1 according to the third embodiment is described with reference to a flowchart of FIG. 10. However, the processes in steps S301 to S305 and S309 to S319 are the same as those in steps S101 to S105 and S107 to S117 in FIG. 4, and thus the description thereof is omitted.

In step S307, the critical band setting unit 27 sets the twelve-tone scale and the critical band using the "frequency-energy characteristics" acquired in step S303. The critical band setting unit 27 classifies sounds of respective frequencies into the twelve-tone scale using the twelve-tone scale and the critical band.

Advantageous Effects

In the third embodiment, the fundamental frequency component and the harmonic component have a relationship with respect to the critical band of human hearing. The third embodiment enables such a relationship to be displayed as an image.

Fourth Embodiment

Figure 11:
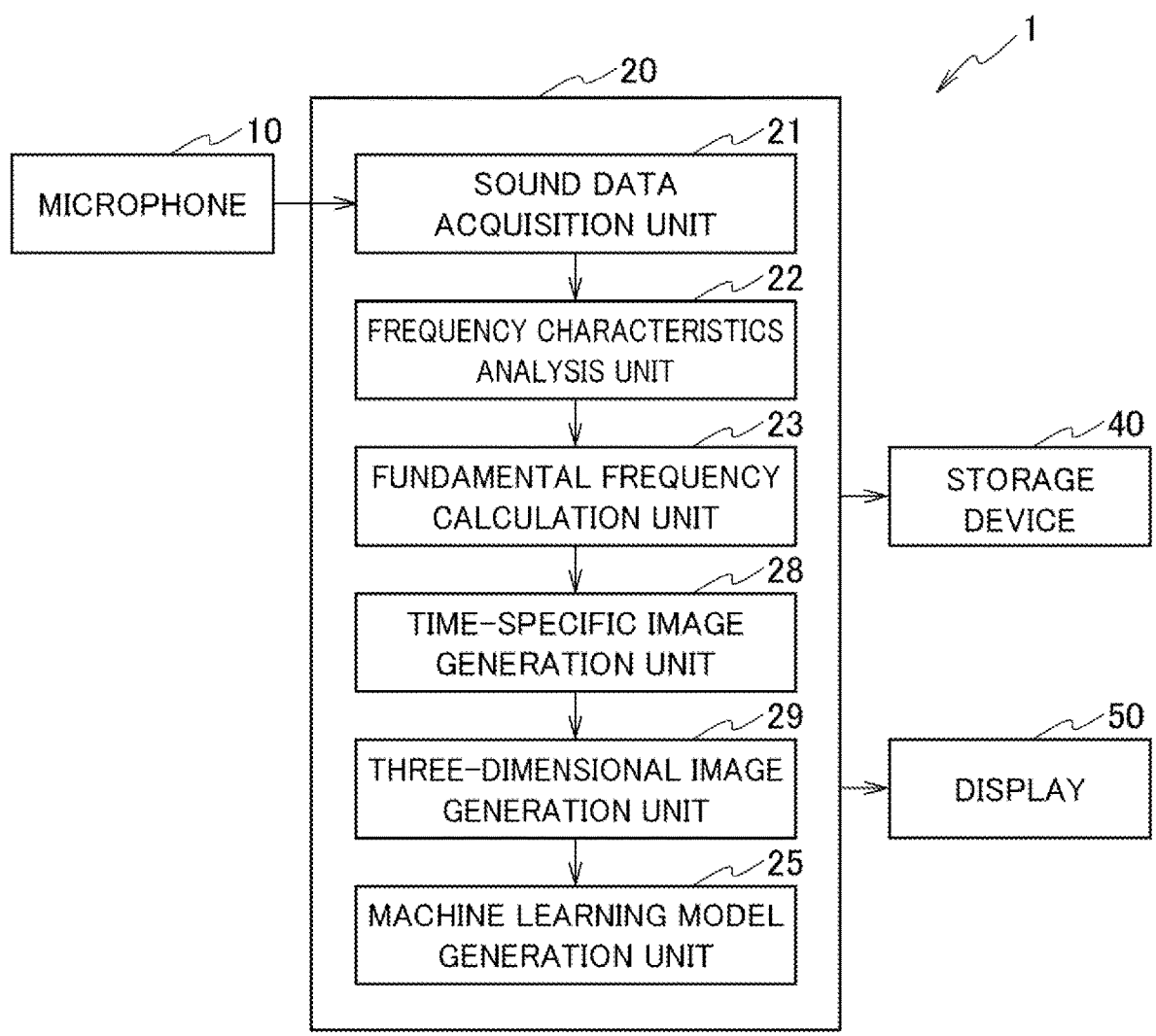
FIG. 11 is a schematic configuration diagram illustrating an image processing apparatus 1 according to a fourth embodiment of the present invention.

Next, a fourth embodiment of the present invention is described with reference to FIGS. 11 to 12. The fourth embodiment differs from the first embodiment in that the controller 20 includes a time-specific image generation unit 28 and a three-dimensional image generation unit 29 instead of the sound data image generation unit 24 (see FIG. 11). A description of a configuration that overlaps the first embodiment is omitted with reference to reference numerals. The following description focuses on the difference.

Figure 12:
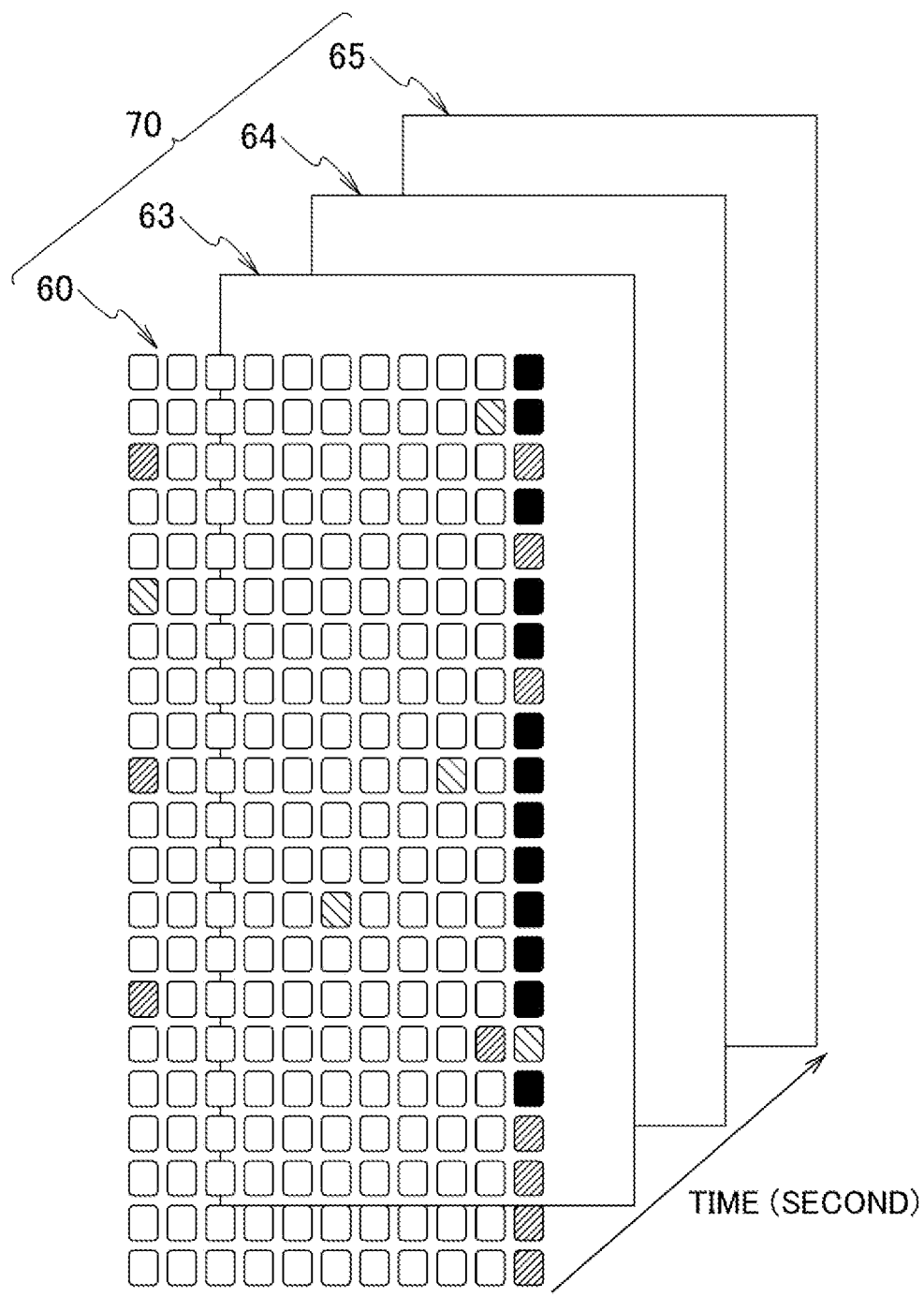
FIG. 12 is an example of an image of sound data according to the fourth embodiment of the present invention.

The image 60 in FIG. 12 is the same as that in FIG. 2A. The time-specific image generation unit 28 generates the image 60 using the fundamental frequency and harmonics calculated by the fundamental frequency calculation unit 23. Further, the time-specific image generation unit 28 performs the same processing every predetermined time to generate image 63 to 65. The three-dimensional image generation unit 29 generates a three-dimensional image 70 using the images 60, and 63 to 65 at every predetermined time generated by the time-specific image generation unit 28. Specifically, the three-dimensional image generation unit 29 adds a time axis to the images 60, and 63 to 65 (two-dimensional images) to generate the three-dimensional image 70. Modifiable matters in the image 60 also apply to the three-dimensional image 70. Due to calculation characteristics of the FFT, the data at every predetermined time are generally calculated by overlapping the data before and after the time axis, and a value at the predetermined time is calculated using data with a time length such that it has a predetermined frequency resolution.

The machine learning model generation unit 25 generates an optimum machine learning model for determining normality and abnormality in sound data using the three-dimensional image 70. The details are the same as those of the first embodiment, and thus the description thereof is omitted.

Figure 13:
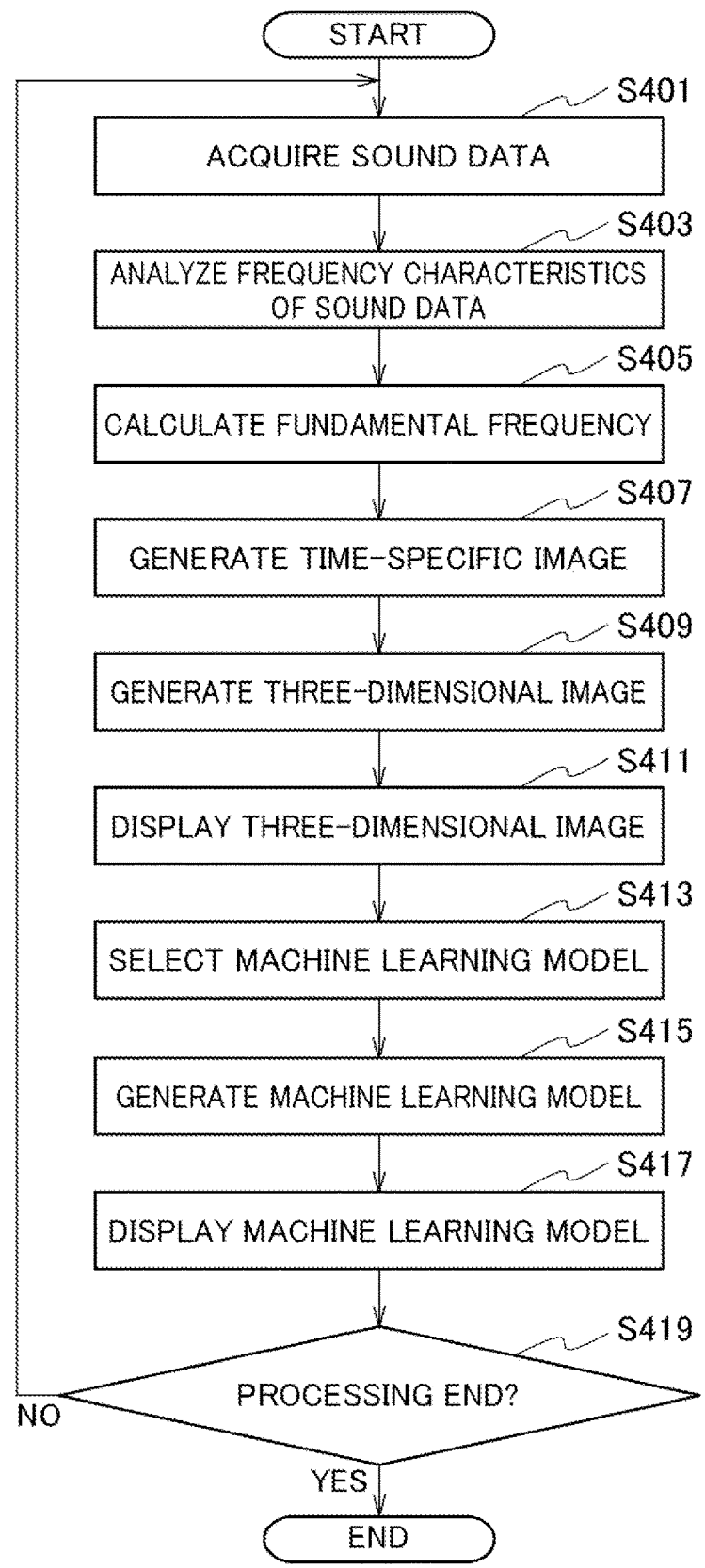
FIG. 13 is a flowchart illustrating an operation example of the image processing apparatus 1 according to the fourth embodiment of the present invention.

Next, an operation example of the image processing apparatus 1 according to the fourth embodiment is described with reference to a flowchart of FIG. 13. However, the processes in steps S401 to S405 and S413 to S419 are the same as those in steps S101 to S105 and S111 to S117 in FIG. 4, and thus the description thereof is omitted.

In step S407, the time-specific image generation unit 28 generates the images 60, and 63 to 65 at predetermined intervals using the fundamental frequency and harmonics acquired in step S405. The process proceeds to step S409, and the three-dimensional image generation unit 29 generates the three-dimensional image 70 using the images 60, and 63 to 65 generated at every predetermined time in step S407. The process proceeds to step S411, and the three-dimensional image 70 generated in step S409 is displayed on the display 50. Each pixel forming the three-dimensional image 70 is set as a brightness or color corresponding to the amplitude of the sound data. Thus, the operator who sees the three-dimensional image 70 can grasp the intensity, normality, abnormality, and the like of the sound data at a glance.

Advantageous Effects

The fourth embodiment enables sound data to be displayed as a three-dimensional image.

Fifth Embodiment

Figure 14:
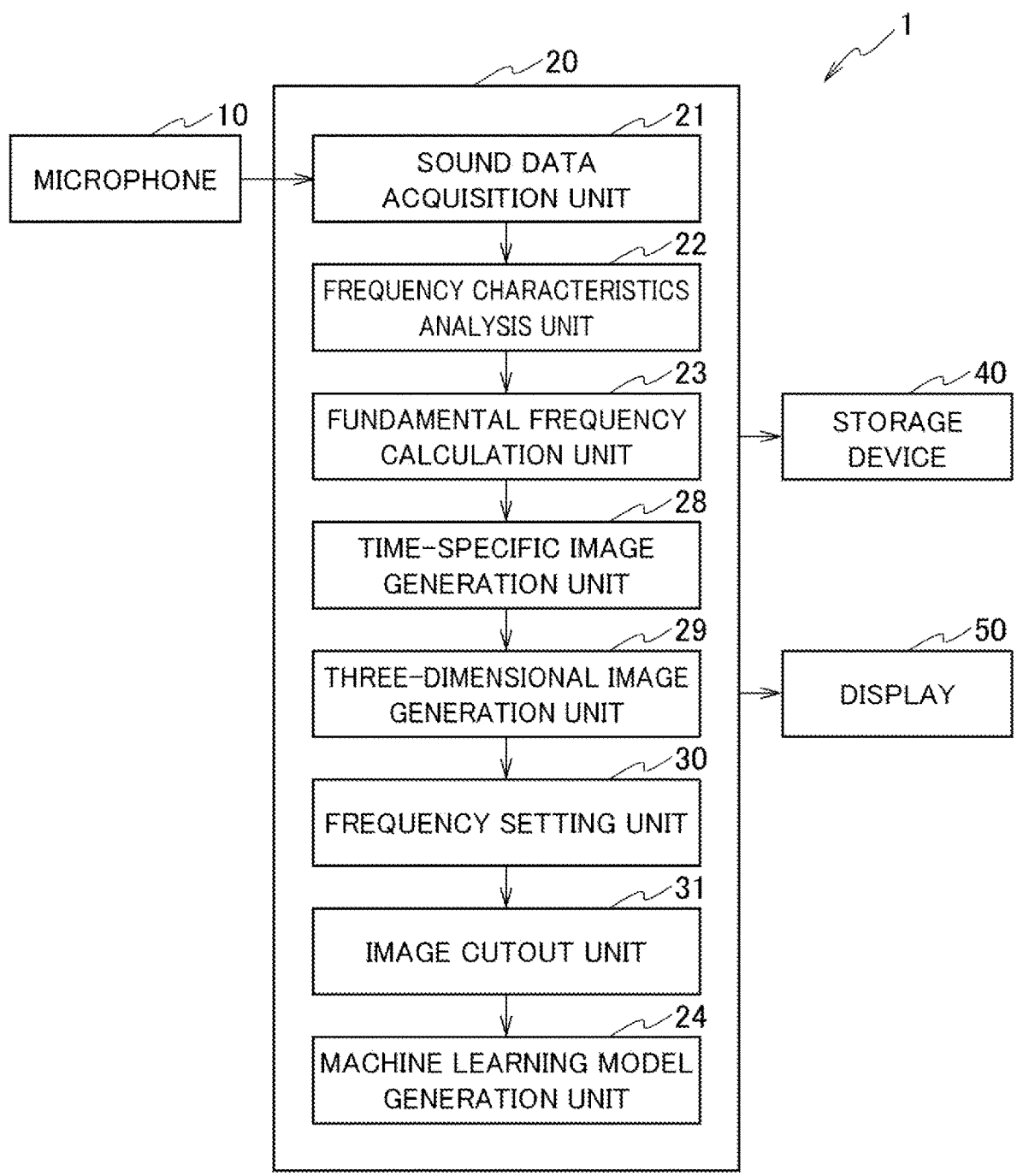
FIG. 14 is a schematic configuration diagram of an image processing apparatus 1 according to a fifth embodiment of the present invention.
Figure 15:
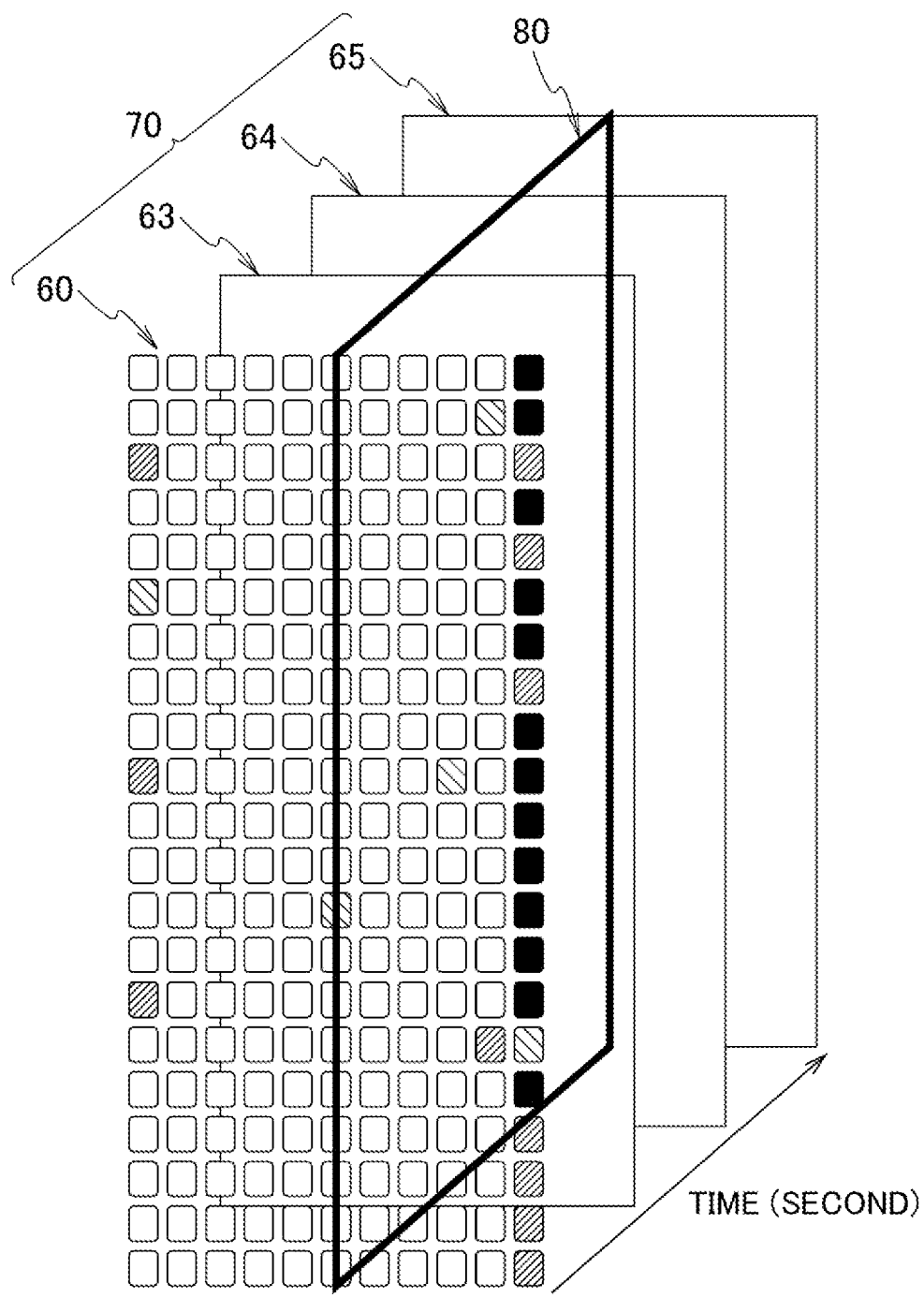
FIG. 15 is a diagram illustrating an example of a method of cutting out an image of sound data.

Next, a fifth embodiment of the present invention is described with reference to FIGS. 14 to 15. The fifth embodiment differs from the fourth embodiment in that the controller 20 further includes a frequency setting unit 30 and an image cutout unit 31 (see FIG. 14). A description of the configuration that overlaps the fourth embodiment is omitted with reference to reference numerals. The following description focuses on the difference.

The frequency setting unit 30 sets a frequency to be extracted from the three-dimensional image 70. The frequency set by the frequency setting unit 30 is any frequency, and the fundamental frequency may be set.

The image cutout unit 31 cuts out pixels related to the frequency set by the frequency setting unit 30. Specifically, as illustrated in FIG. 15, the image cutout unit 31 cuts out data 80 of a plurality of pixels corresponding to the frequency set by the frequency setting unit 30. The image cutout unit 31 generates a spectrogram using the cutout data 80. A spectrogram is an arrangement in which a spectrum of frequency characteristics is arranged on a time axis, and intensity is represented by colors, like a heat map.

The machine learning model generation unit 25 generates an optimum machine learning model for determining normality and abnormality in sound data using the spectrogram. The details are the same as those of the first embodiment, and thus the description thereof is omitted.

Figure 16:
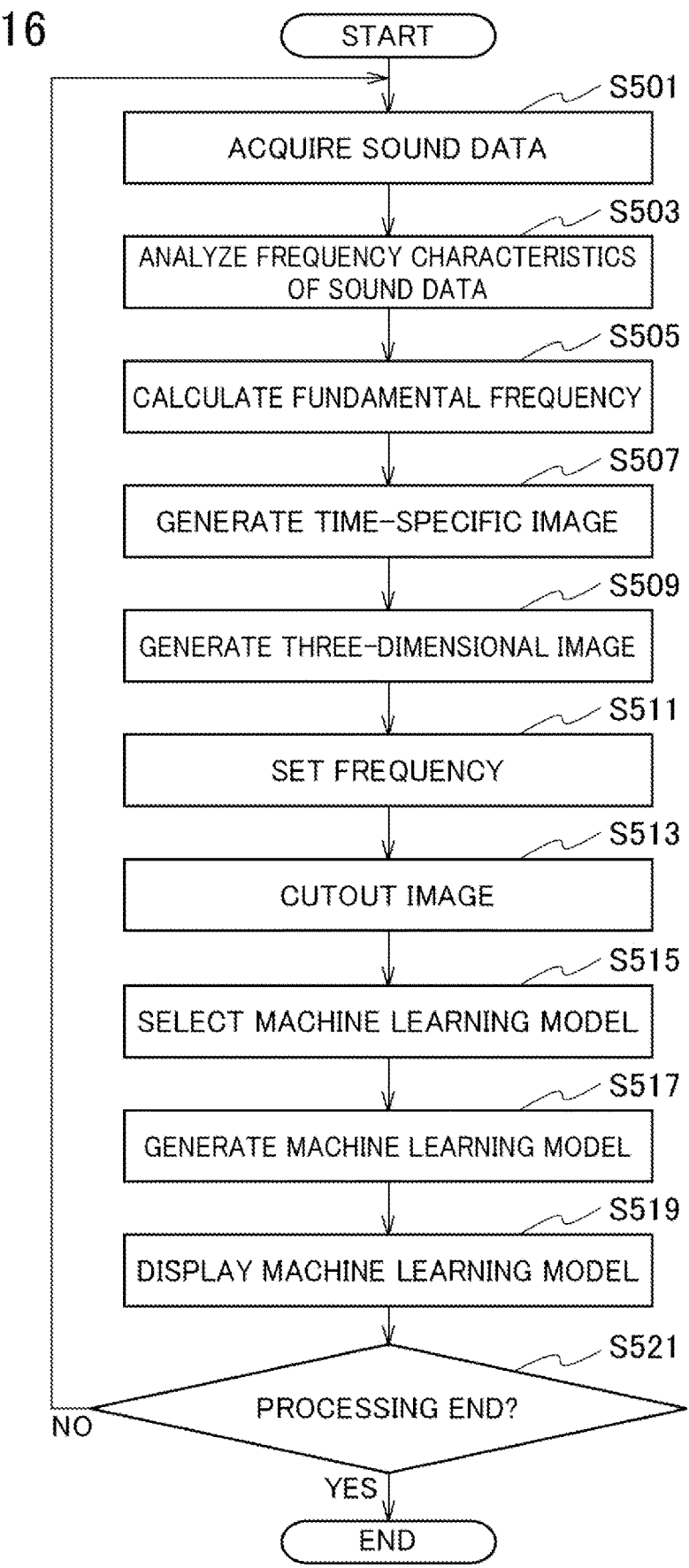
FIG. 16 is a flowchart illustrating an operation example of the image processing apparatus 1 according to the fifth embodiment of the present invention.

Next, an operation example of the image processing apparatus 1 according to the fifth embodiment is described with reference to a flowchart of FIG. 16. However, the processes in steps S501 to S509 and S515 to S521 are the same as those in steps S401 to S409 and S413 to S419 in FIG. 13, the description thereof is omitted.

In step S511, the frequency setting unit 30 sets a frequency to be extracted from the three-dimensional image 70. The process proceeds to step S513, and the image cutout unit 31 cuts out pixels relating to the frequency set in step S511. The image cutout unit 31 generates a spectrogram using the cutout pixels.

Advantageous Effects

The fifth embodiment enables analysis to be performed using a spectrogram.

Sixth Embodiment

Figure 17:
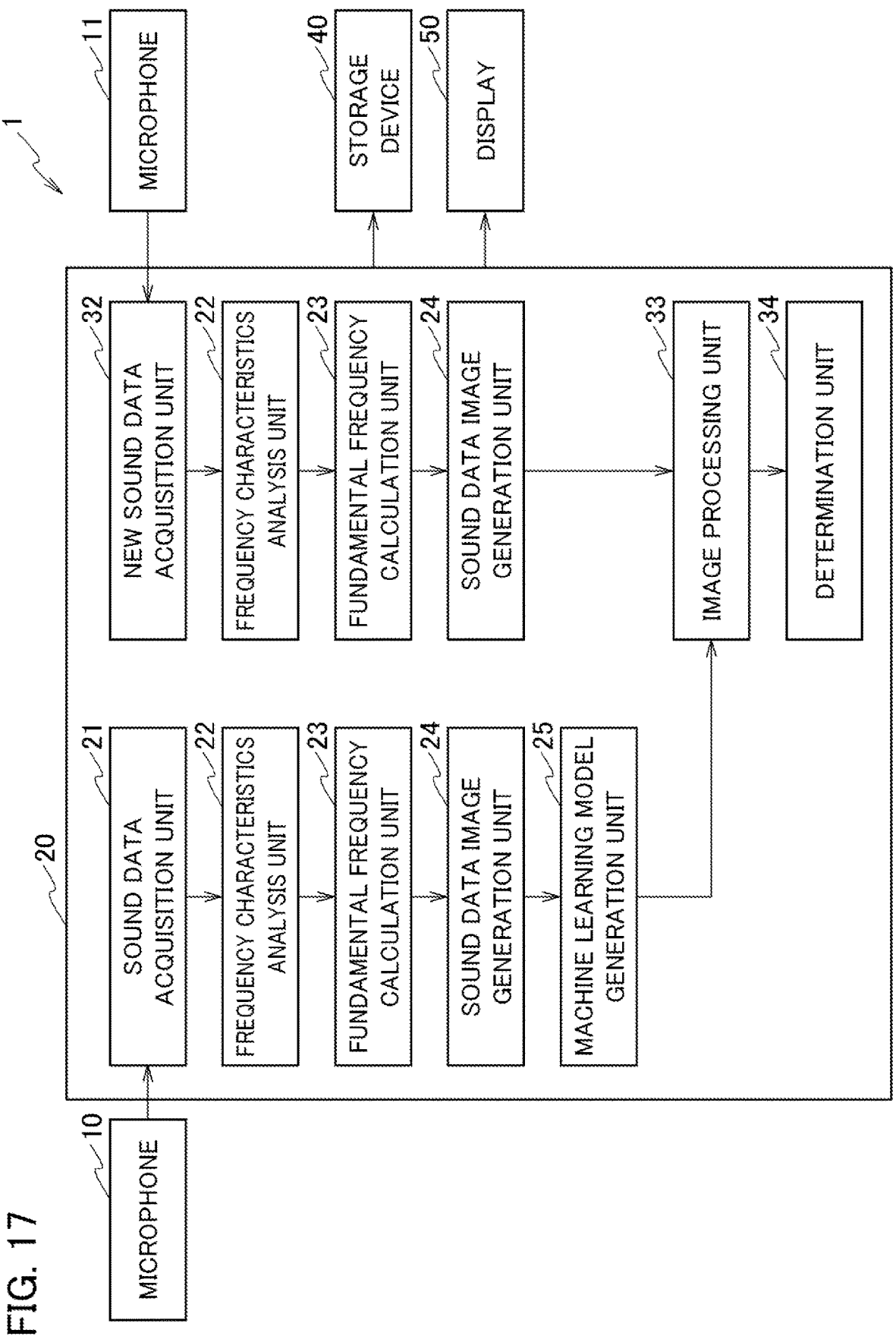
FIG. 17 is a schematic configuration diagram of an image processing apparatus 1 according to a sixth embodiment of the present invention.

Next, a sixth embodiment of the present invention is described with reference to FIG. 17. The sixth embodiment differs from the first embodiment in that the controller 20 includes a new sound data acquisition unit 32, an image processing unit 33, and a determination unit 34. A description of a configuration that overlaps the first embodiment is omitted with reference to reference numerals. The following description focuses on the difference.

The new sound data acquisition unit 32 acquires new sound data via a microphone 11 different from the microphone 10. The microphones 10 and 11 are attached to machines of the same type. The sound data image generation unit 24 generates an image of the new sound data.

The image processing unit 33 uses the image of the new sound data as input data of the machine learning model generated by the machine learning model generation unit 25. The image processing unit 33 outputs an index, such as the degree of agreement of images, using a predetermined image processing method.

The determination unit 34 compares the output value output by the image processing unit 33 with a preset threshold value. When the output value is greater than the threshold value, the determination unit 34 determines that the sound data is normal. In contrast, when the output value is equal to or less than the threshold value, the determination unit 34 determines that the sound data is abnormal. Note that the determination method is not limited to a method using a threshold value, and other methods may be used.

The determination result by the determination unit 34 is displayed on the display 50. Although not illustrated, the determination result by the determination unit 34 may be notified by voice through a speaker. When the determination result by the determination unit 34 is abnormal, a red rotating light may be turned on.

Figure 18A:
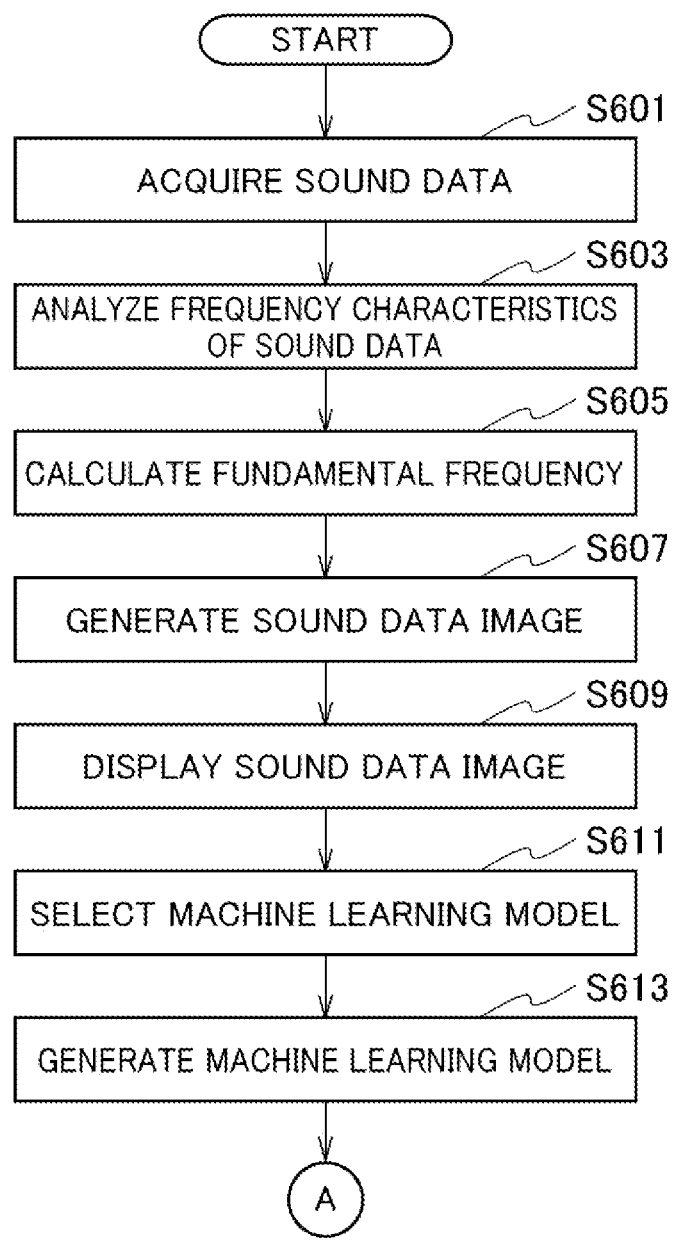
FIG. 18A is a flowchart illustrating an operation example of the image processing apparatus 1 according to the sixth embodiment of the present invention.
Figure 18B:
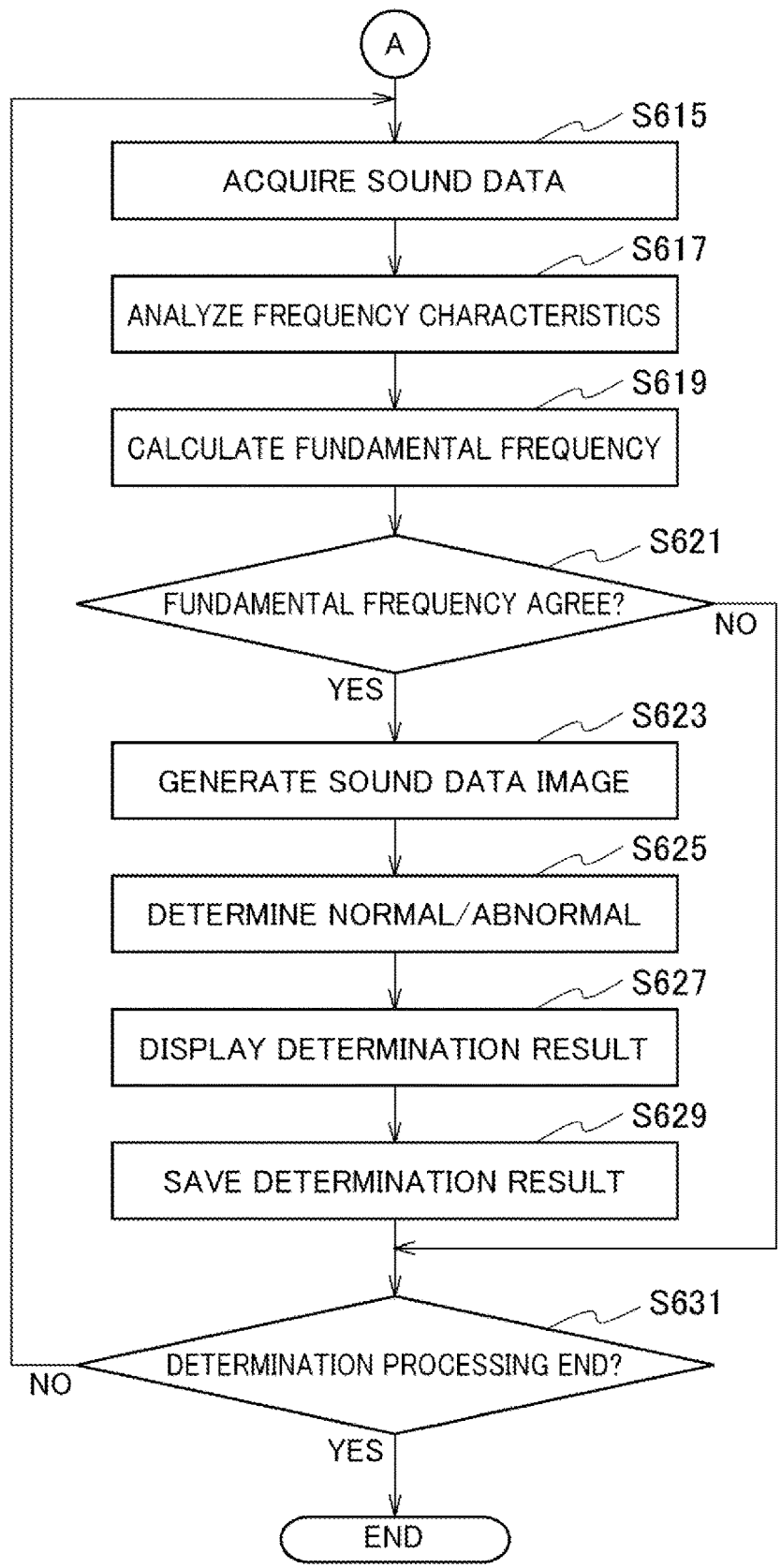
FIG. 18B is a flowchart illustrating an operation example of the image processing apparatus 1 according to the sixth embodiment of the present invention.

Next, an operation example of the image processing apparatus 1 according to the sixth embodiment is described with reference to flowcharts of FIGS. 18A and 18B. However, the processes in step S601 to S613 are the same as those in steps S101 to S113 in FIG. 4, and thus the description thereof is omitted.

In step S615, the new sound data acquisition unit 32 acquires new sound data via the microphone 11. The acquired new sound data is converted into an electric signal and treated as time series data. The process proceeds to step S617, and the frequency characteristics analysis unit 22 analyzes the electric signal acquired in step S615 using the FFT. The FFT provides the "frequency-energy characteristics".

The process proceeds to step S619, and the fundamental frequency calculation unit 23 calculates a fundamental frequency of the new sound data using the "frequency-energy characteristics" acquired in step S617. The process proceeds to step S621, and it is determined whether the fundamental frequency calculated in step S619 agrees with the fundamental frequency of the machine learning model generated in step S613. The reason for this determination is that when the fundamental frequencies are different, the machine learning model cannot perform the normal and abnormal determination processing. Note that "the fundamental frequencies agree with each other" means substantial agreement.

When the fundamental frequencies do not agree with each other (NO in step S621), "Determination processing not possible due to disagreement of fundamental frequencies" is displayed on the display 50, and the process proceeds to step S631. In contrast, when the fundamental frequencies agree with each other (YES in step S621), the process proceeds to step S623, and the sound data image generation unit 24 generates an image of the new sound data using the fundamental frequency calculated in step S619.

The process proceeds to step S625, and the image processing unit 33 uses the image of the new sound data generated in step S623 as input data for the machine learning model. The image processing unit 33 outputs an index, such as the degree of agreement of images, using a predetermined image processing method. The determination unit 34 compares the output value output by the image processing unit 33 with a preset threshold value to determine whether the sound data is normal or abnormal.

The process proceeds to step S627, and the determination result of step S625 is displayed on the display 50. The process proceeds to step S629, and a file name of the new sound data, a name of the machine learning model, a processing execution time, a value of the fundamental frequency, a determination result, and the like are stored in the storage device 40. A series of processing is repeatedly executed until completion (step S631). Note that when the processing is completed, a notice "End of normal/abnormal determination processing" may be displayed on the display 50.

Advantageous Effects

The sixth embodiment makes it possible to determine whether other sound data are normal or abnormal using a machine learning model acquired by imaging sound data.

Each of the functions described in the above embodiments may be implemented by one or more processing circuits. The processing circuit includes a programmed processing device, such as a processing device including an electric circuit. The processing circuit also includes devices, such as an application specific integrated circuit (ASIC) arranged to perform the described functions and circuit components.

While embodiments of the present invention have been described as above, the statements and drawings that form part of this disclosure should not be understood as limiting the invention. Various alternative embodiments, examples, and operating techniques will become apparent to those skilled in the art from this disclosure.

In the above-described embodiments, a machine learning model is used as a method for determining normality and abnormality in other sound data, but the method is not limited thereto. For example, an abnormality in the image (sound data) may be determined by comparing the fundamental frequency component and harmonic component with other frequency components. This makes it possible to determine whether the sound data is normal or abnormal in a case where there is no overtone relation, such as a critical band.

Further, the determination unit 34 may determine an abnormality in a predetermined sound included in sound data using the image 60 (sound image).

The image 60 (sound image) may be made from a two-dimensional matrix including a fundamental frequency component and harmonic component converted into image data, and other frequency components converted into image data, wherein a predetermined area is set for each frequency component. Note that the other frequency components mean frequency components other than the fundamental frequency component and the harmonic component.

REFERENCE SIGNS LIST

1 Image processing apparatus
20 Controller
21 Sound data acquisition unit
22 Frequency characteristics analysis unit
23 Fundamental frequency calculation unit
24 Sound data image generation unit
25 Machine learning model generation unit
26 Scale setting unit
27 Critical band setting unit
28 Time-specific image generation unit
30 Frequency setting unit
31 Image cutout unit
32 New sound data acquisition unit
33 Image processing unit
34 Determination unit
40 Storage device
50 Display

The invention claimed is:

1. An image processing apparatus for acquiring sound data from a machine and analyzing the sound data that have been acquired, the image processing apparatus comprising:
a controller configured to:
transform the sound data to a frequency domain;
calculate a fundamental frequency component included in the sound data and a harmonic component corresponding to the fundamental frequency component, wherein the fundamental frequency is calculated based on a difference of frequencies between peaks in the frequency domain and a frequency of a first peak in the frequency domain; and
convert the fundamental frequency component and the harmonic component that have been calculated into image data;
generate a sound image comprising a two-dimensional matrix including the fundamental frequency component, the harmonic component, and other frequency components that have been converted into the image data arranged into predetermined areas, the arrangement based on the fundamental frequency component, and
determine, using a machine learning model generated with labelled sound images having a first fundamental frequency the same as the fundamental frequency, whether an abnormality is present in the machine using the sound image,
wherein in the sound image the fundamental frequency component and the harmonic component that have been converted into the image data are arranged adjacent each other,
wherein the two-dimensional matrix having a predetermined area set for each frequency component.

2. The image processing apparatus according to claim 1, wherein the fundamental frequency component and the harmonic component have an overtone relationship, a same pitch name, or a relationship with respect to a critical band of human hearing.

3. The image processing apparatus according to claim 1, wherein the controller arranges the fundamental frequency component and the harmonic component adjacent to each other on a vertical axis or a horizontal axis of the sound image.

4. The image processing apparatus according to claim 1, wherein the controller generates the sound image by converting the fundamental frequency component and the harmonic component into image data in which a brightness or a color corresponding to an amplitude of the sound data is set.

5. The image processing apparatus according to claim 1, wherein the controller arranges a plurality of frequency components of the sound data in frequency order on a vertical axis or a horizontal axis of the sound image.

6. The image processing apparatus according to claim 1, wherein
the controller determines an abnormality in the sound image with the machine learning model by comparing the fundamental frequency component and the harmonic component with the other frequency components.

7. A method of determining an abnormality in a machine, comprising:
- acquiring sound data of the machine;
- transforming the sound data to a frequency domain forming frequency data;
- calculating a fundamental frequency component included in the sound data and a harmonic component corresponding to the fundamental frequency component, wherein the fundamental frequency is calculated based on a difference of frequencies between peaks in the frequency data and a frequency of a first peak in the frequency data;
- converting the fundamental frequency component and the harmonic component that have been calculated into image data;
- generating a sound image comprising a two-dimensional matrix including the fundamental frequency component, the harmonic component, and other frequency components that have been converted into image data arranged into predetermined areas, the arrangement based on the fundamental frequency component, and
- determining, using a machine learning model generated with labelled sound images having a first fundamental frequency the same as the fundamental frequency, whether an abnormality is present in the machine using the sound image,
- wherein in the sound image the fundamental frequency component and the harmonic component that have been converted into the image data are arranged adjacent each other,
- wherein the two-dimensional matrix having a predetermined area set for each frequency component.

* * * * *